United States Patent [19]

Dabbs

[11] Patent Number: 5,491,550
[45] Date of Patent: Feb. 13, 1996

[54] INTERFERENCE METHODS AND INTERFERENCE MICROSCOPES FOR MEASURING ENERGY PATH LENGTH DIFFERENCES, PATH LENGTH BETWEEN TWO LOCATIONS OR FOR DETERMINING REFRACTIVE INDEX

[75] Inventor: Timothy P. Dabbs, West Ryde, Australia

[73] Assignee: Commonwealth Scientific and Industrial Research Organization, Campbell, Australia

[21] Appl. No.: 977,399

[22] PCT Filed: Aug. 30, 1991

[86] PCT No.: PCT/AU91/00406

§ 371 Date: Jul. 23, 1993

§ 102(e) Date: Jul. 23, 1993

[87] PCT Pub. No.: WO92/04594

PCT Pub. Date: Mar. 19, 1992

[30] Foreign Application Priority Data

Aug. 31, 1990 [AU] Australia .................................. PK2088
Feb. 21, 1991 [AU] Australia .................................. PK4715

[51] Int. Cl.⁶ .................................................. G01B 9/02
[52] U.S. Cl. ...................... 356/345; 356/360; 250/227.27
[58] Field of Search ...................... 356/345, 357, 356/358, 359, 360, 361, 376, 445; 250/227.11, 227.27

[56] References Cited

U.S. PATENT DOCUMENTS 4,627,731 12/1986 Waters et al. ............................ 356/358
4,928,527 5/1990 Burger et al. ............................ 356/358
5,177,566 1/1993 Leuchs et al. ........................... 356/361

FOREIGN PATENT DOCUMENTS

WO9011484 10/1990 WIPO .
WO9109271 6/1991 WIPO .

*Primary Examiner*—Samuel A. Turner
*Attorney, Agent, or Firm*—Morgan & Finnegan

[57] ABSTRACT

Interference methods and interference microscopes for measuring energy path length differences, path length between two locations or for determining refractive index are disclosed. According to one embodiment a confocal interference microscope (100) may be employed to build up an interferogram of surface (123) of object (124) as follows. A portion of the light beam from coherent laser diode (101) is coherently guided to exit (115) and focussed into a diffraction limited spot (125) intersecting surface (123) by high quality lens (122). A portion of the scattered signal light resulting from spot (125) is collected by lens (122) and confocally injected back into exit (115) to be guided back to coupler (108). A second portion of the light beam from diode (101) is coherently guided to end (121) from whence it emerges collimated. This collimated beam termed the reference beam is partially reflected by mirror (126) through end (121) and is guided back to coupler (102) where it interferes with the signal beam. The result of the interference is detected by detector (127) and fed to a computer (128). A portion of the signal light injected into fibre exit (115) is guided to detector (145) which detects the intensity level. This intensity level is fed to a computer (128) and used to control scanner (130) so as to maintain the focus of spot (125) on surface (123). A portion of the reference beam reflected by mirror (126) is injected into single mode fibre (135) and guided coherently to coupler (138) where it interferes with illuminating light guided coherently from laser diode (101) and thence detected by detector (142). The resulting signal is fed to a computer (128). While scanner (130) is moving the exits the computer (128) keeps track of their position by monitoring the interference signal from detector (142).

20 Claims, 6 Drawing Sheets

INTERFERENCE METHODS AND INTERFERENCE MICROSCOPES FOR MEASURING ENERGY PATH LENGTH DIFFERENCES, PATH LENGTH BETWEEN TWO LOCATIONS OR FOR DETERMINING REFRACTIVE INDEX

BACKGROUND OF THE INVENTION

1. Field of the Invention

This invention relates to methods and microscopes for measuring the difference(s) between at least two energy path lengths.

2. Description of the Related Art

Conventional microscopes have a large depth of field or axial resolution compared to their lateral resolution. Confocal microscopes have approximately 30% better lateral resolution and much better axial resolution than conventional microscopes. To get high lateral resolution surface profiles of objects it is common to use an interference microscope. It would be advantageous to combine the properties of an interference microscope with those of a confocal microscope. Standard confocal microscopes suffer from alignment problems and require large numbers of components precisely located with respect to each other on an optical bench arrangement. Confocal interference microscopes also have severe stability problems due to such things as air currents and minor temperature fluctuations. In addition, a normal interference confocal microscope has a very limited depth of field and is difficult to scan rapidly.

SUMMARY OF THE INVENTION

The present invention is directed to a method and an interference microscope for measuring energy path length differences, path length between two locations and for determining the refractive index of a material.

According to the present invention, a method is provided for measuring the difference between two energy path lengths, comprising:

coherently directing a portion of an illuminating energy beam from a coherent energy source through a first coherent energy guide to an energy exit port denoted the first exit;

coherently directing a second portion of the illuminating energy beam through a second coherent energy guide to an energy exit port denoted the second exit;

wherein the first and second portions of the illuminating energy beam are at least partly coherent with respect to one another on emerging from the first and second exits respectively;

focussing coherently at least a portion of illuminating energy emerging from the first exit into a spot intersecting an object;

coherently directing at least a portion of a coherent signal energy beam resulting from interaction between the illuminating energy beam in the spot and the object to an interferometer, the signal beam being coherent with respect to the illuminating energy beam;

directing coherently at least a portion of the second portion of the illuminating energy beam, denoted the reference beam, from the second exit to the interferometer whereby the reference beam and the signal beam interfere thereby producing an output signal; and calculating from the output signal the energy path length difference between the first energy path from the energy source, through the first energy guide to the intersection of the spot with the object and from the intersection to the interferometer and the second energy path from the energy source, through the second energy guide to the interferometer.

Other methods for measuring the difference between two energy path lengths are described herein below.

The present invention further provides a microscope for measuring the difference(s) between two or more energy path lengths.

The microscope comprises:

an energy source which emanates an illuminating energy beam wherein at least a portion of the illuminating energy beam is substantially coherent;

a first coherent energy guide operatively associated with the energy source to receive coherently a first portion of the coherent illuminating energy beam, the first coherent energy guide having an energy exit port denoted the first exit;

a second coherent energy guide operatively associated with the energy source to receive coherently a second portion of the coherent illuminating energy beam, the second coherent energy guide having an energy exit port denoted the second exit;

wherein the illuminating energy beams are coherent with respect to one another on emerging from the first and second exits;

an energy focusser operatively associated with the first exit for focussing coherently at least a portion of illuminating energy emerging from the first exit into a spot intersecting an object;

a first energy director operatively associated with the first exit and the focusser for coherently directing at least a portion of a signal energy beam resulting from interaction between the illuminating energy beam in the spot and the object to an interferometer. The signal beam being coherent with respect to the illuminating energy beam;

a second energy director operatively associated with the second exit and the interferometer to direct coherently at least a portion of the second portion of the illuminating energy beam, denoted the reference beam, from the second exit to the interferometer whereby the reference beam and the signal beam interfere thereby producing an output signal; and a calculator operatively associated with the interferometer to calculate from the output signal the energy path length difference between the first energy path from the energy source, through the first energy guide to the intersection of the spot with the object via the focusser and from the intersection to the interferometer via the first energy director and the second energy path from the energy source through the second energy guide to the interferometer via the second energy director.

BRIEF DESCRIPTION OF THE DRAWINGS

FIGS. 4, and 4a are a schematic drawings of a surface profiler according to the present invention;

Figure 1:
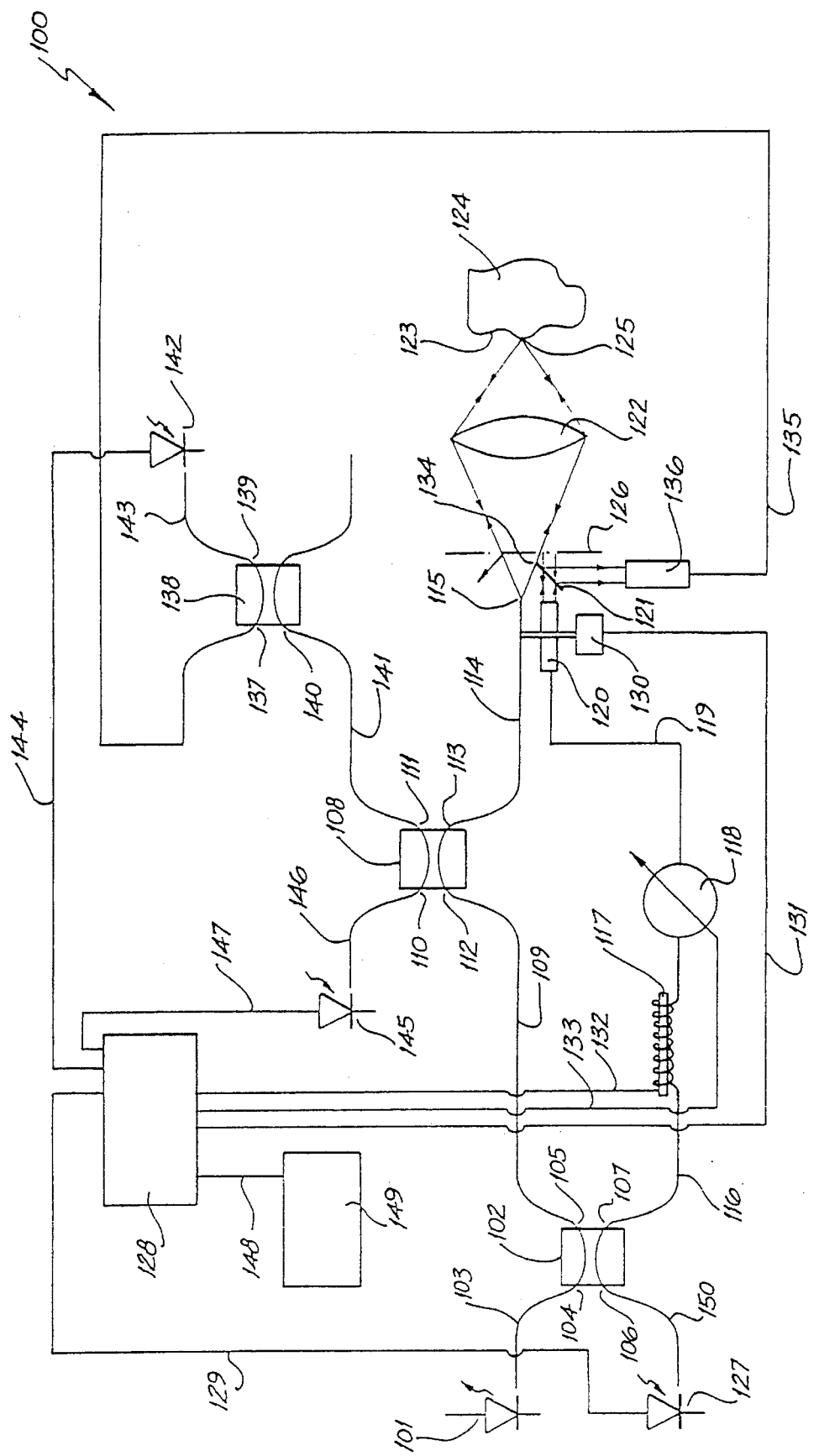
FIG. 1 is a schematic drawing of an interference microscope according to the present invention.

Objects of this invention are to provide methods and microscopes for measuring the difference(s) between at least two energy path lengths.

DESCRIPTION OF PREFERRED EMBODIMENTS

For a discussion of "interfere" and "interferes" in accordance with the intended meaning in this specification reference is made to Principles of Optics, Max Born and M.L. Wolf, Pergamon Press, 6th Corrected edition, reprinted 1984 Chapters VII and X, the contents of which are incorporated herein by cross reference.

Throughout the specification the word "spot" used in the context of energy being focussed into a spot refers to the three dimensional volume defined by the high energy density surrounding what is commonly termed the point of focus. Throughout the specification the words "intersection" and "intersecting" used in the context of a spot intersecting an object refers to a surface or intersection between the spot and the object, the surface being located on or in the object. Where reference is made herein to a coherent energy source it is intended to include a partially coherent energy source such as that produced by an LED, for example.

According to a first embodiment of this invention there is provided a method for measuring the difference between two energy path lengths, comprising:

coherently directing a portion of an illuminating energy beam from a coherent energy source through a first coherent energy guide to an energy exit port denoted the first exit;

coherently directing a second portion or the illuminating energy beam through a second coherent energy guide to an energy exit port denoted the second exit:

wherein the first and second portions of the illuminating energy beam are at least partly coherent with respect to one another on emerging from tire first and second exits respectively;

focussing coherently at least a portion of illuminating energy emerging from tire first exit into a spot intersecting an object;

coherently directing at least a portion of a coherent signal energy beam resulting from interaction between the illuminating energy beam in the spot and the object to an interferometer the signal beam being coherent with respect to the illuminating energy beam;

directing coherently at least a portion of the second portion of the illuminating energy beam, denoted the reference beam, from the second exit to the interferometer whereby the reference beam and the signal beam interfere thereby producing an output signal; and calculating from the output signal the energy path length difference between the first energy path from the energy source through the first energy guide to the intersection of the spot with the object and from the intersection to the interferometer and the second energy path from the energy source, through the second energy guide to the interferometer.

According to a second embodiment of this invention there is provided a method for measuring the difference between two energy path lengths, comprising:

coherently directing a portion of an illuminating energy beam from a coherent energy source through a first coherent energy guide to an energy exit port denoted the first exit;

coherently directing a second portion of the illuminating energy beam through a second coherent energy guide to an energy exit port denoted the second exit;

wherein the first and second portions of the illuminating energy beam are at least partly coherent with respect to one another on emerging from the first and second exits respectively;

focussing coherently at least a portion of illuminating energy emerging from the first exit into a first spot intersecting an object:

coherently directing at least a portion of a first coherent signal energy beam resulting from interaction between the illuminating energy beam in the first spot and the object to an interferometer, the first signal beam being coherent with respect to the illuminating energy beam;

focussing coherently at least a portion of illuminating energy emerging from the second exit into a second spot intersecting the object:

coherently directing at least a portion of a second coherent signal energy beam resulting from interaction between the illuminating energy beam in the second spot and the object to the interferometer, the second signal beam being coherent with respect to the illuminating energy beam;

whereby the first and second signal beams interfere thereby producing an output signal; and calculating from the output signal the energy path length difference between the first energy path from the energy source, through the first energy guide to the-intersection of the first spot with the object to the interferometer and the second energy path from the energy source, through the second energy guide to the intersection of the second spot with the object to the interferometer.

According to a third embodiment of this invention there is provided a method for determining refractive index of an object between two locations in the object, comprising the method of the second embodiment wherein the object is a partially energy transparent object with known path length between first and second locations in the object and wherein the first spot is at the first location in the object, the second spot is formed by focussing through the object via the first location to the second location in the object, and wherein the method further comprises:

determining the refractive index of the object between the first and second locations in the object by comparing the energy path length difference with the known path length.

According to a fourth embodiment of this invention there is provided a method for determining the path length between two locations in an object, comprising the method of the second embodiment wherein the object is a partially energy transparent object with known refractive index between first and second locations in the object and wherein the first spot is at the first location in the object, the second spot is formed by focussing through the object via the first location to the second location in the object, and wherein the method further comprises:

determining the path length between the first and second locations by comparing the energy path length difference with the known refractive index.

According to a fifth embodiment of this invention there is provided a method for determining refractive index of an object between two locations in the object, wherein the object is a partially energy transparent object with known path length between first and second locations in the object, comprising:

(a) coherently directing a portion of an illuminating energy beam from a coherent energy source through a first coherent energy guide to an energy exit port denoted the first exit;

(b) coherently directing a second portion of the illuminating energy beam through a second coherent energy guide to an energy exit port denoted the second exit:

wherein the first and second portions of the illuminating energy beam are at least partly coherent with respect to one another on emerging from the first and second exits respectively;

(c) focussing coherentive at least a portion of illuminating energy emerging from the first exit into a first spot intersecting the object at a first location;

(d) coherently directing at least a portion of a first coherent signal energy beam resulting from interaction between the illuminating energy beam in the first spot and the object at the first location to an interferometer, the first signal beam being coherent with respect to the illuminating energy beam;

(e) directing coherently at least a portion of the second portion of the illuminating energy beam, denoted the first reference beam, from the second exit to the interferometer whereby the first reference beam and the first signal beam interfere thereby producing a first output signal; and (f) calculating from the first output signal the first energy path length difference between a first energy path from the energy source, through the first energy guide to the intersection of the first spot with the object at the first location and from the first location to the interferometer and a second energy path from the energy source, through the second energy guide to the interferometer;

(g) repeating steps (a) and (b);

(h) focussing coherently at least a portion of illuminating energy emerging from the first exit through the object via the first location into a second spot intersecting the object at a second location;

(i) coherently directing at least a portion of a second coherent signal energy beam resulting from interaction between the illuminating energy beam from the second spot and the object at the second location to an interferometer, the second signal beam being coherent with respect to the illuminating energy beam;

(j) directing coherently at least a portion of the second portion of the illuminating energy beam, denoted the second reference beam, from the second exit to the interferometer whereby the second reference beam and the second signal beam interfere thereby producing a second output signal; and (k) calculating from the second output signal the second energy path length difference between a third energy path from the energy source through the first energy guide to the intersection of the second spot with the object at the second location and from the second location to the interferometer and a fourth energy path from the energy source, through the second energy guide to the interferometer;

(l) determining the refractive index of the object between the first and second locations in the object by comparing the first and second energy path length differences with the known path length.

In the event that nothing affecting the second path length changes between steps (a)–(f) and (g)–(k) the fourth energy path and the second energy path will be the same.

According to a sixth embodiment of this invention there is provided a method for determining path length between two locations in an object, wherein the object is a partially energy transparent object with known refractive index between first and second locations in the object, comprising:

(a) coherently directing a portion of an illuminating energy beam from a coherent energy source through a first coherent energy guide to an energy exit port denoted the first exit:

(b) coherently directing a second portion of the illuminating energy beam through a second coherent energy guide to an energy exit port denoted the second exit;

wherein the first and second portions of the illuminating energy beam are at least partly coherent with respect to one another on emerging from the first and second exits respectively;

(c) focussing coherently at least a portion of illuminating energy emerging from the first exit into a first spot intersecting the object at a first location;

(d) coherently directing at least a portion of a first coherent signal energy beam resulting from interaction between the illuminating energy beam in the first spot and the object at the first location to an interferometer, the first signal beam being coherent with respect to the illuminating energy beam;

(e) directing coherently at least a portion of the second portion of the illuminating energy beam, denoted the first reference beam, from the second exit to the interferometer whereby the first reference beam and the first signal beam interfere thereby producing a first output signal; and (f) calculating from the first output signal the first energy path length difference between a first energy path from the energy source, through the first energy guide to the intersection of the first spot with the object at the first location and from the first location to the interferometer and a second energy path from the energy source, through the second energy guide to the interferometer;

(g) repeating steps (a) and (b);

(h) focussing coherently at least a portion of illuminating energy emerging from the first exit through the object via the first location into a second spot intersecting the object at a second location;

(i) coherently directing at least a portion of a second coherent signal energy beam resulting from interaction between the illuminating energy beam in the second spot and the object at the second location to an interferometer, the second signal beam being coherent with respect to the illuminating energy beam;

(j) directing coherently at least a portion of the second portion of the illuminating energy beam, denoted the second reference beam, from the second exit to the interferometer whereby the second reference beam and the second signal beam interfere thereby producing a second output signal; and (k) calculating from the second output signal the second energy path length difference between a third energy path from the energy source, through the first energy guide to the intersection of the spot with the object at the second location and from the second location to the interferometer and a fourth energy path from the energy source, through the second energy guide to the interferometer;

(l) determining the path length between the first and second locations in the object by comparing the first and second energy path length differences with the known refractive index.

In the event that nothing affecting the second path length changes between steps (a)–(f) and (g)–(k) the fourth energy path and the second energy path will be the same.

The following comments apply to the first to sixth embodiments.

Typically, the methods further include scanning the object by moving the spot(s) relative to the object.

The spot(s) may be moved relative to the object by scanning the first exit and typically the second exit and/or the focusser(s) and/or the object.

The signal energy beam(s) may be spatially filtered confocally before the interferometer.

The methods of the fourth and sixth embodiments may be used to adjust accurately two adjustable locations in an object to a very high resolution.

The methods of the third and fifth embodiments may be used to adjust accurately an adjustable refractive index in an object between two locations to a very high resolution.

In the calculating step memory may be used to store the path length differences for different positions of the spot's intersection(s) with the object whereby the height differences between positions in and about the object are determined by comparing the path length differences.

Using the methods of the invention a two dimensional interferogram can be built up of a surface by moving the spot(s) in a two dimensional grid in the plane of the surface and interferometrically determining the height differences between points on the grid. One such application would provide a 2 dimensional refractive index map of an object.

Using the methods of the invention a three dimensional interferogram can be built up of an object by moving the spot(s) in a three dimensional grid in and about the object and interferometrically determining the height differences between points in the grid. One such application would provide a 3 dimensional refractive index map of an object.

A 2 or 3 dimensional stress or strain map of an object can be built up by comparing interferograms before and after the application of a deforming force or energy (such as heat).

Using the methods of the invention, by measuring along a line along the surface of an object the surface profile, surface roughness or surface inclination can be determined to a high degree of accuracy.

Using the methods of the invention, by measuring along two lines along two surfaces of an object the refractive index profile or path length or thickness profile can be determined to a high degree of accuracy.

Using the methods of the invention when the object is a memory storage object in which information is encoded by height differences of a plurality of memory storage locations on or in the object the information can be read. Because the methods of the invention can be used to read differences in height with a narrow depth of field multiple parallel surfaces can be located through an object and read in addition, because the methods can be used to a high degree of axial resolution information encryption can be in complex code such as octal as well as simple code such as binary. Further, the information encryption could be refractive index encoded instead of height encoded.

According to a seventh embodiment of this invention there is provided a microscope for measuring the difference between two energy path lengths comprising:

an energy source which eliminates an illuminating energy beam wherein at least a portion of the illuminating energy beam is substantially coherent;

a first coherent energy guide operatively associated with the energy source to receive coherently a first portion of the coherent illuminating energy beam, the first coherent energy guide having an energy exit port denoted the first exit;

a second coherent energy guide operatively associated with the energy source to receive coherently a second portion of the coherent illuminating energy beam, the second coherent energy guide having an energy exit port denoted the second exit;

wherein the illuminating energy beams are coherent with respect to one another on emerging from the first and second exits;

an energy focusser operatively associated with the first exit for focussing coherently at least a portion of illuminating energy emerging from the first exit into a spot intersecting an object;

a first energy director operatively associated with the first exit and the focusser for coherently directing at least a portion of a signal energy beam resulting from interaction between the illuminating energy beam in the spot and the object to an interferometer, the signal beam being coherent with respect to the illuminating energy beam;

a second energy director operatively associated with the second exit and the interferometer to direct coherently at least a portion of the second portion of the illuminating energy beam, denoted the reference beam, from the second exit to the interferometer whereby the reference beam and the signal beam interfere thereby producing an output signal; and a calculator operatively associated with the interferometer to calculate from the output signal the energy path length difference between the first energy path from the energy source, through the first energy guide to the intersection of the spot with the object via the focusser and from the intersection to the interferometer via the first energy director and the second energy path from the energy source, through the second energy guide to the interferometer via the second energy director.

According to an eighth embodiment of this invention there is provided a microscope for measuring the difference between two energy path lengths comprising:

an energy source which emanates an illuminating energy beam wherein at least a portion of the illuminating energy beam is substantially coherent;

a first coherent energy guide operatively associated with the energy source to receive coherently a first portion of the coherent illuminating energy beam, the first coherent energy guide having an energy exit port denoted the first exit;

a second coherent energy guide operatively associated with the energy source to receive coherently a second portion or the coherent illuminating energy beam, the second coherent energy guide having an energy exit port denoted the second exit;

wherein the illuminating energy beams are coherent with respect to one another on emerging from the first and second exits;

a first energy focusser operatively associated with the first exit for focussing coherently at least a portion of illuminating energy emerging from the first exit into a first spot intersecting an object;

a first energy director operatively associated with the first exit and the first focusser for coherently directing at least a portion of a first signal energy beam resulting from interaction between the illuminating energy beam in the first spot and the object to an interferometer, the first signal beam being coherent with respect to the illuminating energy beam;

a second energy focussed operatively associated with the second exit for focussing coherently at least a portion of illuminating energy emerging from the second exit into a second spot intersecting an object;

a second energy director operatively associated with the second exit and the second focussed for coherently directing at least a portion of a second signal energy beam resulting from interaction between the illuminating energy beam ill the second spot and the object to the interferometer, the second signal beam being coherent with respect to the illuminating energy beam;

whereby the first and second signal beams interfere thereby producing an output signal; and a calculator operatively associated with the interferometer to calculate from the output signal the energy path length difference between the first energy path from the energy source, through the first energy guide to the intersection of the first spot with the object via the first focussed and from the intersection of the first spot with the object to the interferometer via the first energy director and the second energy path from the energy source, through the second energy guide to the intersection of the second spot with the object via the second focusser and from the intersection of the second spot with the object to the interferometer via the second energy director.

The first and second focussers may be the same focusser or different focussers.

The first and second spots may be adjacent to one another, overlapping with one another, axially and/or laterally offset with respect to one another and/or in different locations in the object or in different objects.

The following comments apply to the ninth and tenth embodiments.

The first and second coherent energy guides may be the same coherent energy guide and/or the first and second directors may be the same director.

The first and/or second director may include an energy guide, a pinhole, a scatterer, a reflector, a polarization device such as a polarizer, polarization rotator (for example a Pockels cell) using the Kerr effect or the Faraday effect for example. an energy condenser or focusser (including a virtual focusser) which may be the energy focusser, or the first and/or second energy focusser, or a different energy focusser, or a combination thereof which may be stationary or movable relative to the object.

It the signal beam is collected by an energy focusser and injected into an energy guide, the energy focusser can be said to be imaging the core of the energy guide at its entrance onto the spot. In this instance, the numerical aperture NA, of the signal originating from the central portion of the spot, the wavelength of the signal energy (and illuminating energy), $\lambda$, and the average diameter, d, of the energy guiding core of the energy guide at its entrance may be related by the equation:

NA<or=0.6×$\lambda$/d

Typically, if the signal beam is collected by an energy focussed and injected into an energy guide, the numerical aperture NA, of the signal originating from the central portion of the spot, the wavelength of the signal energy, $\lambda$, and the average diameter, d, of the energy guiding core of the energy guide at its entrance are related by the equation:

NA<or=0.13×$\lambda$/d

The first and/or second energy directors may comprise portions of the first and lot second energy guides.

The first and second exits may be coupled so as to be fixed relative to one another and the microscope may further comprise a scanner operatively associated with the exits to move the spot(s) relative to the object.

The first and/or second exits may include a collimator to collimate the energy emanating therefrom.

The first and/or second energy path may include an energy attenuator.

The first and/or second energy path may include an energy path length changer.

The calculator may be operatively associated with the energy path length changer to enable quadrature operation of the interferometer.

An energy detector may be operatively associated with the first energy director to detect the intensity of the signal energy. The detector may be operatively associated with the end of an energy guide operatively associated with an energy splitter on the first energy guide.

An energy detector may be operatively associated with the second energy director to detect the intensity of the reference beam. The detector may be operatively associated the end of an energy guide operatively associated with an energy splitter on the second energy guide.

There may be an apparatus for measuring a change in an energy path length such as that disclosed in International Patent Application No. PCT/AU91//00154 (formerly Australian Provisional Patent Application No. PJ9777) the contents of which are incorporated herein by cross reference, operatively associated with the first or second exits to determine the position of the first exit with respect to the focusser or the position of the second exit with respect to a reference position.

The microscope may include a third coherent energy guide operatively associated with the energy source, a first energy splitter operatively associated with the third coherent energy guide and the first and second energy guides whereby coherent illuminating energy emanating from the energy source is coupled coherently into the third energy guide which guides coherently a portion of the illuminating energy to the first energy splitter wherein a portion of the energy is coupled coherently into the first energy guide and another portion of the illuminating energy is coupled coherently into the second energy guide. The first energy splitter may be the interferometer.

The energy interferometer may be a second energy splitter or the detecting element of a detector, for example. The second energy splitter and the first energy splitter may be parts of the same energy splitter.

The microscope can include a scanner operatively associated with the first exit, and typically the second exit, and/or the focusser and/or the object whereby the spot can be moved relative to the object.

The polarization of the first and second portions of the coherent illuminating energy beam may be at different angles to one another.

The interaction of a spot with an object may be occlusion, scattering, reflection, emission having a coherence related to the illuminating energy beam such as spontaneous emission for example or other like at least partially coherence maintaining interactions.

The calculator may include memory to store the path length differences for positions of the spots' intersections on the object whereby the calculator can determine the height difference between two positions on the object by comparing the path length differences.

The energy source can provide a solid particle beam, such as a neutron, proton or electron beam or a beam of alpha particles, acoustic waves, such as sound waves, or electromagnetic radiation, such as gamma rays, x-rays, UV light, visible light, infrared light or microwaves. Generally the energy source is a source of electromagnetic radiation with a wavelength in the range of and including far UV to far IR and the energy guide is an optical fibre.

Examples of light sources include incandescent sources, such as tungsten filament source, vapor lamps such as halogen lamps including sodium and iodine vapor lamps, discharge lamps such as xenon arc lamp and a Hg arc lamp, solid state light sources such as photo diodes, super radiant diodes, light emitting diodes, laser diodes, electroluminiscent light sources, frequency doubled lasers, laser light sources including rare gas lasers such as an argon laser, argon/krypton laser, neon laser, helium neon laser, xenon laser and krypton laser, carbon monoxide and carbon dioxide lasers, metal ion lasers such as cadmium, zinc, mercury or selenium ion lasers, lead salt lasers, metal vapor lasers such as copper and gold vapor lasers, nitrogen lasers, ruby lasers, iodine lasers, neodymium glass and neodymium YANG lasers, dye lasers such as a dye laser employing rhodamine 640, Kiton Red 620 or rhodamine 590 dye, and a doped fibre laser.

The focusser can be refractive lenses, including microscope objectives, reflective lenses, and/or holographic optic elements. If the energy is of a frequency other than in the range of UV to near infrared light or other types of energies analogous focussing elements are used in place of the optical focussing elements.

The energy guide can be a slab waveguide. The slab waveguide can be a single mode slab waveguide.

The energy guide can be an energy fibre.

The energy guide can be a multi mode optical fibre.

The energy guide can be a single mode optical fibre. For example, a four micron core fibre which is single mode at a wave length of 633 nanometers given an appropriate refractive index profile. A step index optical fibre becomes single mode when the numerical aperture, NA, the fibre core radius, a, and the wave length of light, $\lambda$, obey the relationship:

$$2 \times \pi \times NA \times a/\lambda \leq 2.405.$$

The energy guide may be a coherent fiber bundle.

The energy splitter may be an energy guide coupler such as an optical fibre coupler or a bulk optic splitter. The optical fibre coupler may be a fused biconical taper coupler, a polished block coupler, a bottled and etched coupler or a bulk optics type coupler with fibre entrance and exit pigtails, a planar waveguide device based on photolithographic or ion-diffusion fabrication techniques or other like coupler.

The scanner can be a piezoelectric, stack, a magnetic core/magnetic coil combination, a mechanical vibrator, an electromechanical vibrator, a mechanical or electromechanical scanning mechanism such as a servomotor, an acoustic coupler electrooptic scanning means or any other suitable means.

The calculator may include optical, electrical, optoelectronic, mechanical or magnetic elements, for example, or may include such techniques as optical and/or electrical heterodyning, quadrature operation, multi area detectors or phase lock loop techniques, for example.

The object may be a fluid or solid or other of matter. The microscope or method could be readily used to determine the shape of an optical element.

The energy may not penetrate the surface of the object or it may penetrate a significant distance beneath the surface.

Generally, according to the invention there is provided a microscope for measuring the difference between two light path lengths comprising:

a light source which emanates an illuminating light beam having at least one wavelength in the range of far UV to far IR wherein at least a portion of the illuminating light beam is substantially coherent;

a first optical fibre operatively associated with a first light splitter to receive coherently a first portion of the coherent illuminating light beam, the first optical fibre having a second light splitter and a light exit port denoted the first exit:

a second optical fibre operatively associated with the light source to receive coherently a second portion or the coherent illuminating light beam via the first light splitter, the second optical fibre having a light exit port denoted the second exit and having a light path length changer;

wherein the illuminating light beams are coherent with respect to one another on emerging from the first and second exits;

a light focusser operatively associated with the first exit for focussing coherently at least a portion of illuminating light emerging from the first exit into a diffraction limited spot intersecting an object;

wherein the focussed is operatively associated with the first exit for coherently directing at least a portion of a signal light beam resulting from interaction between the spot and the object to the first exit and thereby to the first light splitter which acts as an inforometer, via the first optical fibre and the second light splitter, the signal beam being coherent with respect to the illuminating light beam;

wherein the numerical aperture NA, or the signal beam originating from the central portion or the spot, the wavelength of the signal light beam, $\lambda$, and average diameter, d, of the light guiding core of the first optical fibre at the first exit are related by the equation:

$$NA < or = 0.6 \times \lambda/d$$

a light reflector operatively associated with the second exit and the interferometer to direct coherently at least a portion of the second portion of the illuminating light beam, denoted the reference beam, to the first light splitter via the second exit and the second optical fibre whereby the reference beam and the signal beam interfere thereby producing an output signal;

a first detector operatively associated with the first splitter to detect the output signal;

a scanner operatively associated with the first and second exits whereby the first and second exits are movable relative to the focusser and the reflector, which focussed and reflector are stationary with respect to the object, but which exits are not movable with respect to each other;

a second detector operatively associated with the second splitter to detect signal light from the first optical fibre; and a calculator operatively associated with the light path length changer, the first detector and the first light splitter to maintain the interference between the reference and signal beams in quadrature, to calculate the light path length difference between the first light path from the light source, through the first optical fibre to the intersection of the spot with the object via the first exit and the focusser and from the intersection back to the first light splitter via the focusser, the first exit and the first optical fibre and the second light path from the light source, through the second optical fibre back to the first light splitter via the second exit, the light reflector and the second exit and back through the second optical fibre, and determine via the second detector when the spot is substantially focussed on the surface of the object.

Additionally, there is provided a microscope for measuring the difference between two light path lengths comprising:

a light source which emanates an illuminating light beam having at least one wavelength in the range of for UV to for IR wherein at least a portion of the illuminating light beam is substantially coherent;

a first optical fibre operatively associated with a first light splitter to receive coherently a first portion of the coherent illuminating light beam, the first optical fibre having a second light splitter and a light exit port denoted the first exit;

a second optical fibre operatively associated with the light source to receive coherently a second portion of the coherent illuminating light beam via the first light splitter, the second optical fibre having a light exit port denoted the second exit and having a light path length changer;

wherein the illuminating light beams are coherent with respect to one another on emerging from the first and second exits;

a light focussed operatively associated with the first exit for focussing coherently at least a portion of illuminating light emerging from the first exit into a first diffraction limited spot intersecting an object;

wherein the focusser is operatively associated with the first exit for coherently directing at least a portion of a first signal light beam resulting from interaction between the first spot and the object to the first exit and thereby to the first light splitter which acts as an interforometer, via the first optical fibre and the second light splitter, the first signal beam being coherent with respect to the illuminating light beam;

wherein the numerical aperture NA, of the first signal beam originating from the central portion of the first spot, the wavelength of the first signal light beam, $\lambda$, and average diameter, d, of the light guiding core of the first optical fibre at the first exit are related by the equation:

$$NA < or = 0.6 \times \pi / d$$

the light focussed being operatively associated with the second exit for focussing coherently at least a portion of illuminating light emerging from the second exit into a second diffraction limited spot intersecting the object;

wherein the focusser is operatively associated with the second exit for coherently directing at least a portion of a second signal light beam resulting from interaction between the second spot and the object to the second exit and thereby to the first light splitter which acts as an interferometer, via the second optical fibre, the second signal beam being coherent with respect to the illuminating light beam;

wherein the numerical aperture NA, of the second signal beam originating from the central portion of the second spot, the wavelength of the second signal light beam, $\lambda$, and average diameter, d, of the light guiding core of the second optical fibre at the second exit are related by the equation:

$$NA < or = 0.6 \times \pi / d$$

whereby the first and second signal beams interfere thereby producing, an output signal;

a first detector operatively associated with the first splitter to detect the output signal;

a scanner operatively associated with the first and second exits whereby the first and second exits are movable relative to the focusser, which is stationary with respect to the object, but are not movable with respect to each other;

a second detector operatively associated with the second splitter to detect signal light from the first optical fibre; and a calculator operatively associated with the light path length changer, the first detector and the first light splitter to maintain the interference between the first and second signal beams in quadrature, to calculate the light path length difference between the first light path from the light source, through the first optical fibre to the intersection of the first spot with the object via the first exit and the focusser and from the intersection back to the first light splitter via the focusser, the first exit and the first optical fibre and the second light path from the light source, through the second optical fibre back to the first light splitter via the second exit, the focusser and from the intersection back to the first light splitter via the focusser, the second exit and the second optical fibre, and determine via the second detector when the first spot is substantially focussed on the surface of the object.

The microscope of the invention combines the resolution advantages of a confocal microscope with those of an interference microscope while being reasonably easy to align and requiring a relatively small number of components which do not have to be mounted on an optical bench. In addition, when energy fibres are used as energy guides the output signal of the interferometer of the invention is relatively stable as a result of guiding energy inside the fibres. Further, the microscope provides relatively massive depth of field and allows very rapid scanning via movement of the energy guide.

Referring to FIG. 1 a microscope for measuring the difference between two energy path lengths 100 has coherent laser diode 101 connected to single mode optical fibre coupler 102 via single mode fibre 103. Coupler 102 has ports 104, 105, 106 and 107. Port 105 is connected to single mode fibre coupler 108 via single mode fibre 109. Coupler 108 has ports 110, 111, 112 and 113. Port 113 of coupler 108 is connected to single mode fibre 114 having exit 115. Port 107 of coupler 102 is connected to single mode fibre 116. Single mode fibre 116 is wrapped partly around piezoelectric cylinder 117 and attached to attenuator 118. Single mode fibre 119 is connected to attenuator 118 and is attached to to GRIN rod lens 120 the end 121 of which is effectively the exit port of fibre 119. Illuminating light beams emerging from ends 121 and 115 are coherent with respect to one another. Lens 122 is operatively associated with exit 115 to focus coherently at least a portion of the light emerging from exit 115 into a spot 125 approximately intersecting the surface 123 of object 124. Lens 122 is operatively disposed to collect at least a portion of the scattered signal light beam resulting from interaction between spot 125 and surface 123 wherein the signal beam is coherent with respect to the illuminating beam. By virtue of reciprocity a portion of the signal light collected by lens 122 is injected into exit 115 and travels to coupler 102 via coupler 108. A partial mirror 126 is positioned to reflect a portion of the light emerging from exit 121 back into exit 121 as a reference beam from whence it travels to coupler 102 via fibres 119 and 116 whereby it interferes with the signal beam thereby producing an output signal which is detected by a detector 127 whose output signal is ted to computer 128 by line 129. Scanner 130 is connected to both fibre 114 and lens 120 and can scan in the X, Y and Z directions as directed by computer 128 via line 131. Piezoelectric cylinder 117 is controlled by computer 128 via line 132 and attenuator 118 is controlled by computer 128 via line 133. A portion of the reference beam reflected by mirror 126 is rereflected by half silvered mirror 134 and injected into single mode fibre 135 by GRIN rod lens 136. The other end of fibre 135 is connected to port 137 of coupler 138. Port 140 of coupler 138 is connected to port 111 of coupler 108 by single mode optical fibre 141. Port 139 of coupler 138 is connected to detector 142 via fibre 143. Detector 142 detects the result of the interference between the reference beam and illuminating beam and sends the resulting signal to computer 128 via line 144. Detector 145 is linked to port 110 of coupler 108 by fibre 146. The signal from detector 145 is sent to computer 128 via line 147. Recorder 149 is connected to computer 128 via line 148.

In operation an interferogram of surface 123 of object 124 is built up as follows. A portion of the light beam from coherent laser diode 101 is coherently guided to exit 115 via single mode fibre 103, coupler 102, single mode fibre 109, coupler 108 and single mode fibre 114 and focussed into a diffraction limited spot 125 approximately intersecting surface 123 of object 124 by a high optical quality lens 122. A portion of the'scattered signal light resulting from the interaction between spot 125 and surface 123, coherent with respect to the illuminating beam, is collected by lens 122 and injected back into exit 115 and is coherently guided back to coupler 102 via fibres 114 and 109 and coupler 108. The numerical aperture, NA, of the signal injected into exit 115, the wavelength of the signal light, λ, and the diameter, d, of the core of single mode fibre 114 are related by the confocal detector pinhole relation:

$$NA < or \approx 0.13 \times \lambda/d$$

A second portion of the light beam from diode 101 is coherently guided to end 121 via single mode fibre 103, coupler 102, single mode fibre 116, attenuator 118, single mode fibre 119 and lens 120 from whence it emerges collimated. This collimated beam is partially reflected by mirror 126 partially back into lens 120 through end 121. Lens 120 injects this reference beam into fibre 119 from whence it is coherently guided to coupler 102 via single mode fibre 119 attenuator 118, single mode fibre 116 and port 107, where it interferes with the signal beam. The result of the interference emerges from port 106 of coupler 102 to be detected by detector 127 via fibre 150 the signal of which is fed to computer 128 by line 129. A portion of the signal light injected into fibre exit 115 emerges from port 110 of coupler 108 to be guided by fibre 146 to detector 145 which detects the intensity level. This intensity level is fed to computer 128 by line 147. A portion of the reference beam reflected by mirror 134 is injected into single mode fibre 135 by lens 136 from whence it is guided coherently to port 137 of coupler 138. This latter light beam interferes in coupler 138 with illuminating light guided coherently from laser diode 101 via single mode fibre 103, coupler 102, fibre 109, coupler 108, single mode fibre 141 and port 140. The result of this interference is fed to detector 142 by fibre 143 where it is detected. The resulting signal from detector 142 is fed to computer 128 by line 144. Computer 128 moves exit 115 and end 121 axially with respect to surface 123 via scanner 130 and line 131. Now to ensure spot 125 substantially intersects surface 123 computer 128 moves exit 115 (and end 121) until detector 145 detects a maximum signal. While scanner 130 is moving the exits computer 128 keeps track of their position by monitoring the interference signal emerging from detector 142. Then computer 128 adjusts attenuator 118 to match the reference beam and signal beam intensities. Computer 128 then stretches fibre 116 with piezoelectric cylinder 117 driven by line 132 to maintain the interference signal in quadrature to ensure high sensitivity. The error signal used to maintain the interferometer in quadrature is coupled with the position of fibre exit 115, as monitored via the signal from detector 142, to determine to a high resolution the height of the surface 123 at that lateral position. This height is stored by recorder 149. Scanner 130 then moves exits 115 and 121 laterally with respect to surface 123 thereby moving spot 125 laterally with respect to surface 123 and the height of the new surface position is determined as described above. This process is repeated until an interferogram of the scanned surface 123 of object 124 has been built up and stored.

Figure 2:
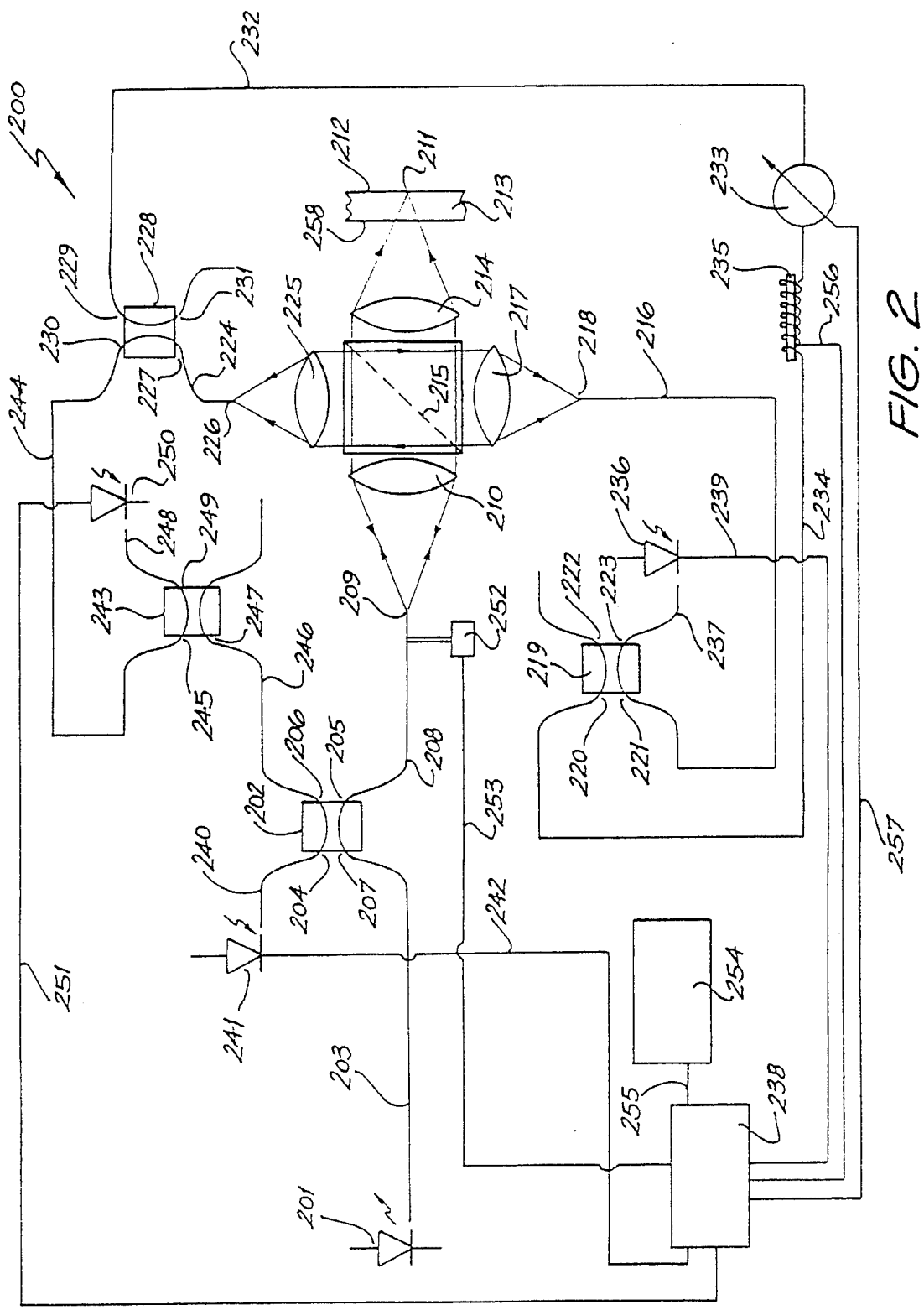
FIG. 2 is a schematic drawing of a refractive index profiler according to the present invention.

Referring to FIG. 2 a microscope for measuring the difference between two energy path lengths 200 has coherent laser diode 201 connected to single mode optical fibre coupler 202 via single mode fibre 203, coupler 202 has ports 204, 205, 206 and 207. Port 205 of coupler 202 is connected to single mode fibre 208 having exit 209. Lens 210 is operatively associated with exit 209 to collect and approximately collimate coherently at least a portion of the light emerging from exit 209. A portion of the approximately collimated light is focussed coherently by lens 214 into a spot 211 approximately intersecting the back surface 212 of object 213, whose thickness is known. Lens 214 is operatively disposed with respect to spot 211 and lens 210 and exit 209 to collect a portion of the reflected signal light beam resulting from interaction between spot 211 and surface 212 and inject it back into fibre 208 via exit 209. The signal beam is coherently guided to coupler 202 via fibre 208 and port 205 and passes through coupler 202 via port 204 and fibre 240 to detector 241. The signal from detector 241 is fed to computer 238 via line 242. Another portion of the reflected signal beam collected by lens 214 is reflected by beam splitter 215 and injected into end 218 of single mode optical fibre 216 by lens 217. Fibre 216 is connected to single mode optical fibre coupler 219 which has ports 220, 221, 222 and 223. A portion of the illuminating light beam approximately collimated by lens 210 is reflected by beam splitter 215 and injected into single mode fibre 224 by very short focal lens (eg 0.05 mm) lens 225 via end 226. This reference beam is guided coherently to coupler 219 via port 227 of single mode fibre coupler 228, port 229 of coupler 228, single mode fibre 232, attenuator 233, single mode optical fibre 234, partially wrapped around piezoelectric cylinder 235 and port 220 of coupler 2 19 where it interferes with the signal beam. The interference signal is detected by detector 236 via fibre 237. The signal from detector 236 is fed to computer 238 via line 239. A portion of the reference beam passing through coupler 228 travels to single mode optical fibre coupler 243 via port 230, single mode fibre 244 and port 245 where it interferes with a portion of illuminating light from laser 201 which travels to coupler 243 via fibre 203, coupler 202, ports 204 and 206, single mode fibre 246 and port 247. The result of the interference is detected by detector 250 via port 249 and fibre 248. The signal from detector 250 is fed to computer 238 via line 251. Scanner 252 is connected to fibre 208 near its end 209 and can scan in the X, Y and Z directions as directed by computer 238 via line 253. Recorder 254 is connected to computer 238 via line 255.

In operation, a refractive index profile of object 213 is built up as follows: A portion of the illuminating light beam from coherent laser diode 201 is coherently guided to exit 209 via fibre 203, coupler 202, ports 207 and 205 and fibre 208 and focussed into a diffraction limited spot 211 approximately intersecting back surface 212 of object 213 by lenses 210, which approximately collimates the beam, and lens 214. A portion of the reflected signal light resulting from the approximate intersection between spot 211 and surface 212, coherent with respect to the illuminating beam, is collected by lens 214 and focussed into the core of end 209 of fibre 208 by lens 210 where the numerical aperture, NA, of the signal injected into exit 209, the wavelength of the signal light, λ, and the diameter, d, of the core of single mode fibre 208 at exit 209 are related by the confocal detector pinhole relation:

$$NA < or \approx 0.6 \times \lambda/d$$

Signal light injected into end 209 of fibre 208 is fed to detector 241 via. ports 205 and 204 of coupler 202 and fibre 240 where its intensity is detected. The signal from detector 241 is fed to computer 238 via line 242.

Another portion of the reflected signal light resulting from the approximate intersection between spot 211 and surface 212, coherent with respect to the illuminating beam, is collected by lens 214 and focussed into the core of end 218 of fibre 216 by lens 217 after reflection by beam splitter 215 where the numerical aperture, NA, of the signal injected into exit 218, the wavelength of the signal light, λ, and the diameter, d, of the core of single mode fibre 216 at exit 218 are related by the confocal detector pinhole relation:

$$NA < or = 0.6 \times \lambda/d$$

Signal light injected into fibre 216 is fed to coupler 219 via port 221. A portion of the illuminating light approximately collimated by lens 210 is injected into the core at end 226 of fibre 224 by very short focal length lens 225. A portion of this illuminating light is coherently guided to coupler 219 via ports 227 and 229 of coupler 228, fibres 232 and 234 attenuator 233 and port 220 where it interferes with the signal beam. The result of this interference is detected by detector 236 via port 223 and line 237. The interference signal from detector 236 is fed to computer 238 by line 239.

Yet another portion of the illuminating light approximately collimated by lens 210 is fed to coupler 243 via beamsplitter 215, very short focal length lens 225, fibre end 226, fibre 224, ports 227 and 230 of coupler 228, fibre 244 and port 245 where it interferes with another portion of illuminating light ted to coupler 243 from laser diode 201 via fibre 203, ports 207 and 206 of coupler 202, fibre 246 and port 247. The result of the interference is fed to detector 250 via port 249 and fibre 248 where it is detected. The interference signal from detector 250 is fed to computer 238 via line 251.

Scanner 252 scans fibre 208 near its end 209 axially with respect to surface 211 tinder control of computer 238 via line 253 such that spot 211 moves through surface 212. The position where spot 211 substantially intersects surface 212 can be found by determining the maximum in the signal at detector 241. Computer 238 monitors the position of end 209 to the nearest interference fringe, and thereby the position of spot 211, by keeping track of the interference signal from detector 250 via line 251. When spot 211 substantially intersects surface 212, attenuator 233 is adjusted by computer 238 via line 257 so that the signal and reference beams are of equal intensities. Then piezoelectric cylinder 235 stretches fibre 234 as directed by computer 238 via line 256 to maintain the interference signal at coupler 219, as monitored by detector 236, in quadrature. The error signal sent to piezoelectric cylinder 235 is a precise measure of the phase of the interference signal at coupler 219 and therefore can be used, together with the interference signal from detector 250, to determine precisely the apparent distance to backsurface 211 of object 213. In a similar manner the precise distance to front surface 258 of object 213 can be determined. The refractive index of object 213 is determined at a given lateral position by comparing the known thickness of object 213 with the apparent thickness as calculated from the measurement or the distance to the front and back surfaces. It surface 258 or 212 is moved laterally with respect to fibre end 209, or if fibre end 209 is moved laterally, and thins spot 211 is moved laterally, the process can be repeated and the refractive index thereby measured over the scanned area of object 213 and stored in recorder 254.

Figure 3:
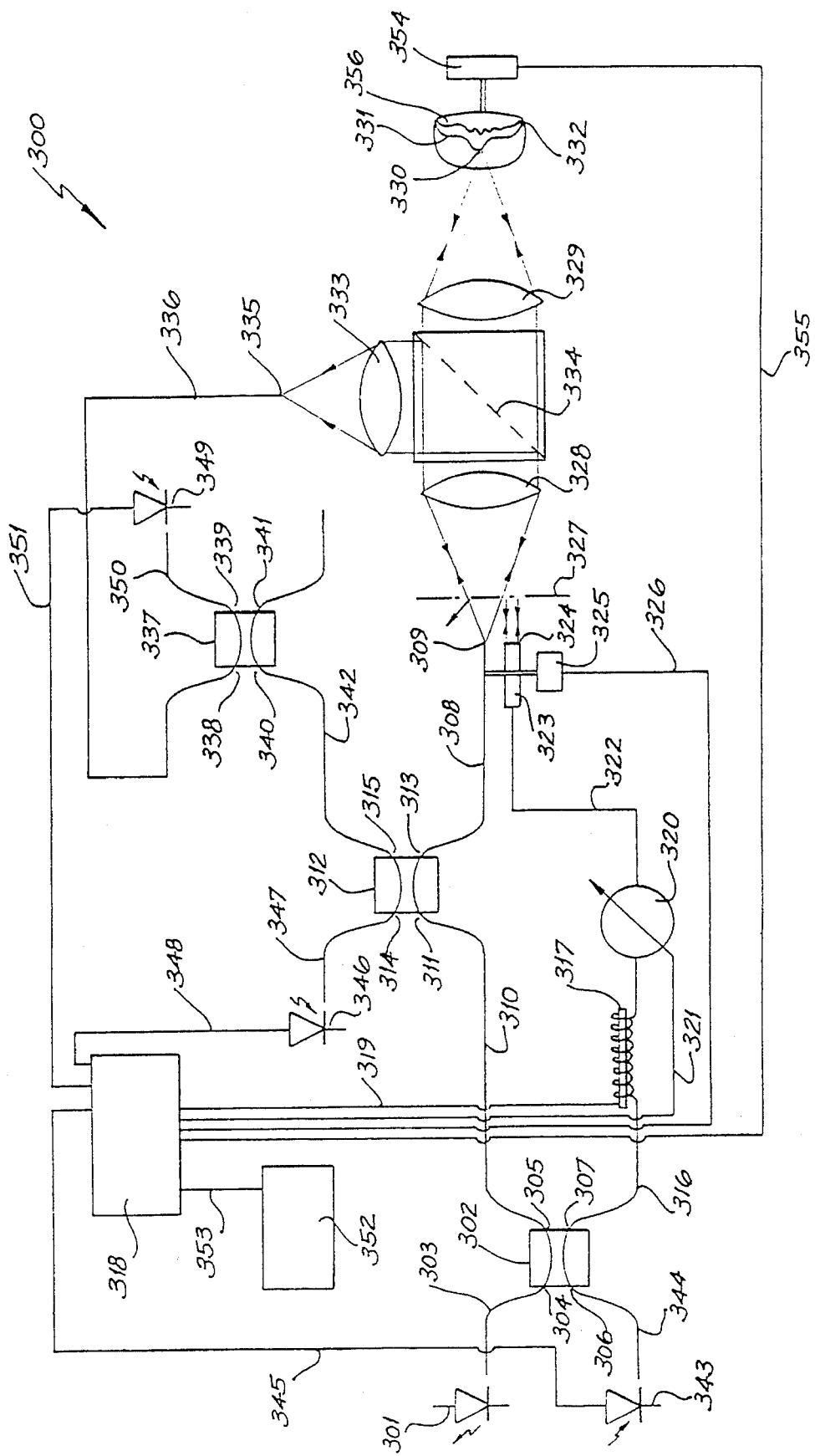
FIG. 3 is a schematic drawing of a memory read head according to the present invention.

Referring to FIG. 3 a microscope for measuring the difference between two energy path lengths 300 has coherent laser diode 301 connected to single mode fibre coupler 302 via single mode fibre 303. Coupler 302 has ports 304, 305, 306 and 307. Port 305 is connected to single mode fibre 308 with exit 309 via single mode fibre 310, ports 311 and 313 of coupler 312 having ports 311,313, 314 and 315. Port 307 is connected to single mode fibre 316 and which is partly wrapped around piezoelectric cylinder 317 which is connected to computer 318 by line 319. Fibre 316 is connected to attenuator 320 which in form is connected to computer 318 by line 321. Single mode optical fibre 322 is connected to GRIN rod lens 323 whose end 324 is the effective exit of fibre 322. Scanner 325 is mechanically linked to lens 323 and end 309 of fibre 308. Scanner 325 is linked to computer 318 via line 326. Partial reflector 327 is disposed with respect to end 324 to reflect a portion of the illuminating light back into fibre 322. Lens 328 is disposed with respect to end 309 to collimate approximately illuminating light emerging therefrom. Lens 329 is disposed to collect and focus approximately collimated light from lens 328 into diffraction limited spot 330 approximately intersecting a surface 331 in memory storage device 332 which has information encoded thereon by height or refractive index differences. Short focal length lens 333 is disposed to focus approximately collimated light from lens 328 reflected by partial beam splitter 334 into the core of end 335 of single mode optical fibre 336. Fibre 336 is connected via port 338 to single mode fibre coupler 337 which has ports 338, 339, 340 and 341. Port 340 or coupler 337 is connected to port 315 of coupler 312 via single mode optical fibre 342. Detector 343 is connected to coupler 302 via fibre 344 and port 306 and computer 318 via line 345. Detector 346 is connected to coupler 312 via fibre 347 and port 314 and to computer 318 via line 348. Detector 349 is connected to coupler 337 via port 339 and fibre 350 and to computer 318 via line 351. Computer 318 is attached to recorder 352 via line 353. Scanner 354 is connected to device 332 and to computer 318 via line 355.

In operation, a portion of the coherent illuminating laser light from laser diode 301 is coherently guided to fibre end 309 via fibre 303, ports 304 and 305 of coupler 302 fibre 310, ports 311 and 313 of coupler 312 and fibre 308. A portion of the coherent illuminating laser light emerging from end 309 is coherently focussed by lenses 328 and 329 into diffraction limited spot 330 approximately intersecting recorded surface 331 of device 332. A portion of the signal light resulting from the partial rejection of spot 330 by surface 331, coherent with respect to the incoming illumination, is collected by lens 329 and focussed into the core of fibre 308 at end 309 by lens 328 from whence it is coherently guided to coupler 312 via port 313 and coupler 302 via ports 313 and 311 of coupler 312, fibre 310 and port 305. The numerical aperture, NA, of the signal injected into exit 309, the wavelength of the signal light, λ, and the diameter, d, of the core of single mode fibre 308 at exit 309 are related by the confocal detector pinhole relation:

$$NA < or \approx 0.13 \times \lambda / d$$

A portion of the signal light entering port 313 of coupler 312 is fed to detector 346 via fibre 347 and port 314 whence it is detected. This detector signal is fed to computer 318 by line 348. Another portion of the light from diode 301 is coherently guided to lens 323 via fibre 303, ports 304 and 307 of coupler 302, fibre 316, attenuator 320 and fibre 322. Illumination entering lens 323 emerges collimated from end 324 to be partially reflected by reflector 327 and reenter lens 323 via end 324 as a reference light beam. This reference beam, coherent with respect to the illumination leaving lens 323, is coherently guided to coupler 302 via fibre 322, attenuator 320, fibre 316 and port 307 where it interferes with the signal light. The signal resulting from the interference is detected by detector 343 via port 306 and fibre 344 and the detected signal is fed to computer 318 via line 345.

A portion of the illuminating light from diode 301 is coherently guided to coupler 337 via fibre 303, ports 304 and 305 of coupler 302, fibre 310, ports 311 and 315 of coupler 312, fibre 342 and port 340. Another portion of illuminating light from diode 301 is coherently guided to coupler 337 via fibre 303, ports 304 and 305 of coupler 302, fibre 310, ports 311 and 313 of coupler 312, fibre 308, end 309, lens 328, splitter 334, lens 333, end 335, fibre 336 and port 338 where it interferes with the other illuminating light entering coupler 337. The signal resulting from the interference is detected by detector 349 via port 339 and fibre 350 and the detector signal is fed to computer 318 via line 351.

While computer 318 is monitoring the position of fibre end 309 by monitoring the signal fed to computer 318 from detector 349 via line 351, fibre exit 309 and end 324 are scanned axially with respect to surface 330 by scanner 325 as controlled by computer 318 by a line 326. Spot 330 is thus located to intersect substantially surface 331 by axially scanning scanner 325 until a maximum at detector 346 is detected and noted by computer 318. The intensities of the signal and reference beams at coupler 302 are then matched, under control of computer 318, by varying the attenuation of attenuator 320. The interference signal detected by detector 343 is then adjusted to the quadrature condition by stretching fibre 316 with piezoelectric crystal 317 as controlled by computer 318 via line 319. This error signal is noted by computer 318 and combined with the approximate position of spot 330 as determined from the position of end 309 via the signal at detector 349 to obtain a precise apparent height for that lateral memory storage location on surface 331. Surface 331 is then moved laterally with respect to spot 330 by scanner 354 to a new memory storage location and the relative precise apparent height determined as described above. By comparing the apparent heights of the two lateral locations computer 318 can decode the information at each location on surface 331 of device 332 and store it for immediate use in recorder 352. Other surfaces can be accessed by microscope 300 by axially moving fiber end 309 sufficiently for that another surface eg surface 356 is intersected by spot 330.

Figure 4:
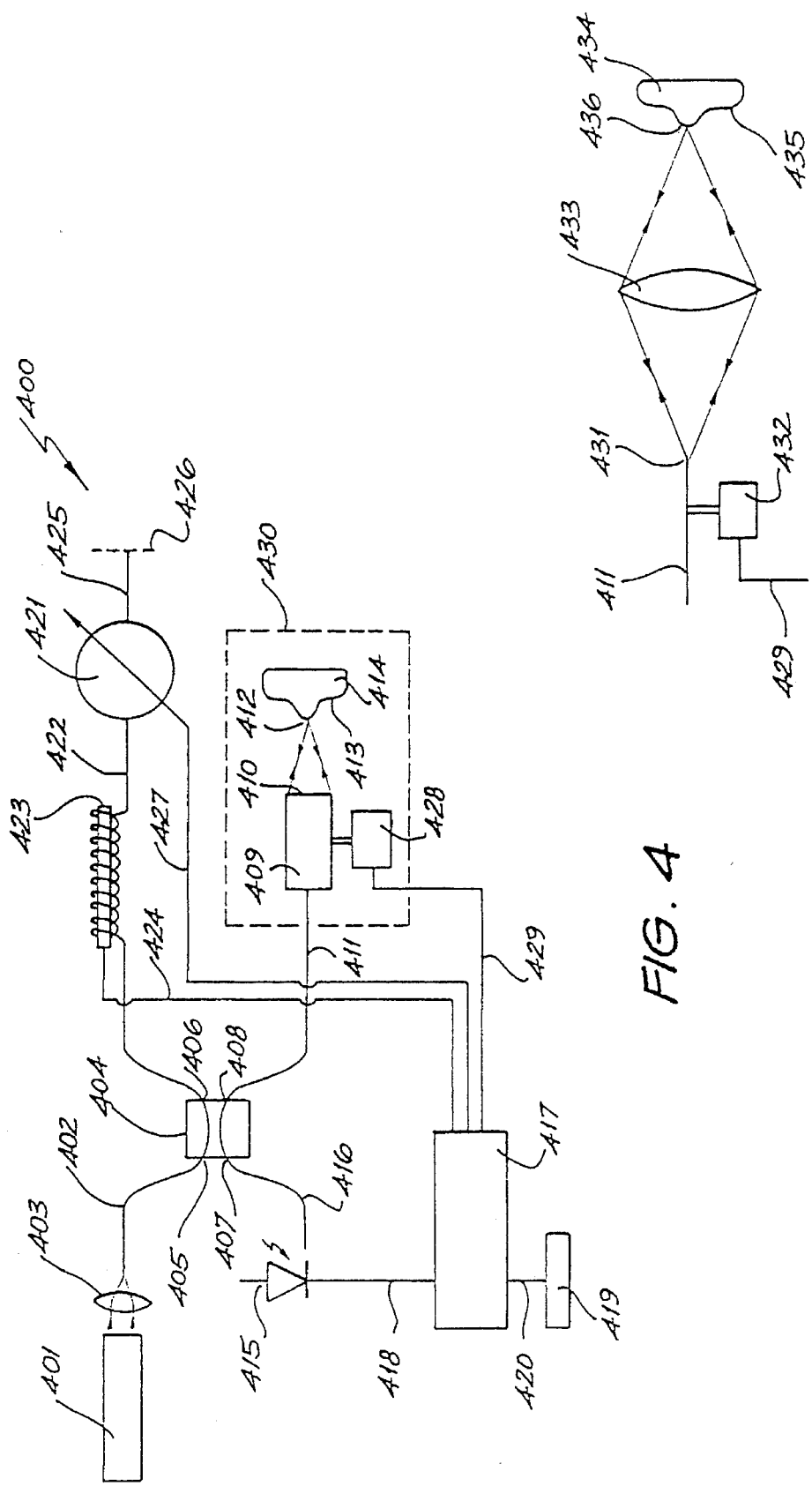

Referring to FIG. 4 a microscope for measuring the difference between two energy path lengths 400 coherent light from Argon Ion laser 401 is injected into single mode optical fibre 402 by lens 403. Fibre 402 is connected to port 405 of single mode optical fibre coupler 404 having ports 405, 406, 407 and 408. Coupler 404 is connected via single mode optical fibre 411 and port 408 to GRIN rod lens 409, having end 410 which is effectively the exit of fibre 411. Lens 409 focusses light from laser 401 into diffraction limited spot 412 approximately intersecting surface 413 of object 414. Port 407 of coupler 404 is connected to detector 415 via fibre 416. The signal from detector 415 is fed to computer 417 via line 418. Computer 417 is connected to plotter 419 via line 420. Port 406 is connected to attenuator 421 by single mode optical fibre 422 which is partly wound around piezoelectric cylinder 423 controlled by computer 417 via line 424. Single mode optical fibre 425, terminated at its exit 426 with a reflective coating, is attached to attenuator 421. Attenuator 421 is controlled by computer 417 via line 427. Scanner 428 is connected to lens 409 and controlled by computer 417 via line 429.

As an alternative arrangement to the elements enclosed by box 430, GRIN rod lens 409 having exit 410 is replaced by exit 431 of fibre 411 and lens 433 disposed with respect to exit 431 to focus illuminating light into diffraction limited spot 436 approximately intersecting surface 435 of object 434 and scanner 428 is replaced by scanner 432 connected to computer 417 by line 429 as shown in FIG. 4A.

In a first mode of operation, a portion of the coherent illuminating light from laser 401 is guided coherently via lens 403, fibre 402, ports 405 and 408 of coupler 404 and fibre 411 to lens 409 which focusses it, via end 410, into diffraction limited spot 412 intersecting surface 413 of object 4 14. The signal beam of light resulting from reflection and scattering of light from spot 412 by surface 413, coherent with respect to the illuminating light beam, is collected by lens 409 via end 410. Another portion of the illuminating light guided to lens 409 via fibre 402, ports 405 and 408 of coupler 404 and fibre 411 is reflected by end 410 to form a reference light beam which interferes with the signal beam. The signal resulting from interference between the two beams travels back to detector 415 via lens 409, fibre 411, ports 408 and 407 of coupler 404 and fibre 416 where it is detected. The signal from detector 415 is fed to computer 417 via line 418. In this mode of operation attenuator 421 attenuates substantially all the illuminating light travelling through fiber 422 as directed by computer 417 via line 427. Scanner 428 moves lens 409 axially with respect to surface 413 until spot 412 substantially intersects surface 413. Computer 417 then notes the interference signal detected by detector 415 via line 418. Scanner 428 then moves lens 409 laterally with respect to surface 413 and the new interference signal is obtained and stored as described above. In this manner the surface profile of object 414 can be built up and plotted by plotter 419 via line 420.

In a second mode of operation, a portion of the coherent illuminating light from laser 401 is guided coherently via lens 403, fibre 402, ports 405 and 408 of coupler 404 and fibre 411 to exit 431 from which it is collected and focussed by lens 433 into diffraction limited spot 436 intersecting surface 435 of object 434. The signal beam of light resulting from reflection and scattering of light from spot 436 by surface 435, coherent with respect to the illuminating light beam, is collected by lens 433 and injected coherently into fibre 411 via end 431. Another portion of the illuminating light guided via fibre 402, ports 405 and 408 of coupler 404 and fibre 41 I is reflected by exit 431 to form a reference light beam which interferes with the signal beam. The signal resulting from interference between the two beams is detected by detector 415 via fibre 411, ports 408 and 407 of coupler 404 and fibre 416. The signal from detector 415 is fed to computer 417 via line 418. In this mode of operation attenuator 412 attenuates substantially all the illuminating light travelling through fiber 422 as directed by computer 417 via line 427. Scanner 432 moves fibre 411 near its exit 431 axially with respect to surface 435 until spot 436 substantially intersects surface 435. Computer 417 then notes the interference signal detected by detector 415 via line 418. Scanner 432 then moves fibre 411 near its exit 431, and thus spot 436, laterally with respect to surface 435 and the new interference signal is obtained and stored as described above. In this manner the surface profile of object 434 can be built up and plotted by plotter 419 via line 420.

In a further mode of operation, end 410 (or exit 431) do not reflect illuminating light. In this instance, attenuator 421 is adjusted by computer 417 via line 427 so that illuminating light from laser 401 is coherently guided to exit 426 via lens 403, fibre 402, ports 405 and 406 of coupler 404, fibre 422, attenuator 421 and fibre 425 where it is reflected by exit 426 to become a reference beam which is coherently guided back to coupler 404 via fibre 425, attenuator 421, fibre 422 and port 406 to interfere with the signal beam from end 410 (or 431) entering coupler 404 via end 410 and lens 409 (or exit 431). fibre 411 and port 408. The interference signal from the coupler is detected by detector 415 via fibre 416. The detector signal is fed to computer 417 via line 418. In this mode. However, when spot 412 (or 436) intersects surface 413 (or 435), attenuator 421 is adjusted so the intensities of the signal and reference beams are equal, and piezoelectric cylinder 423 stretches fibre 422, as controlled by computer 417 via line 424, so that the interferometer is maintained in the highly sensitive quadrature condition. Scanner 428 (or 432) then moves lens 409 (or fibre 411 near its exit 431), and thus spot 412 (or 436), laterally with respect to surface 413 (or 435) and the new interference signal is obtained and stored as described above. In this manner the surface profile of object 414 (or 434) can be built up and plotted by plotter 419 via line 420.

Figure 5:
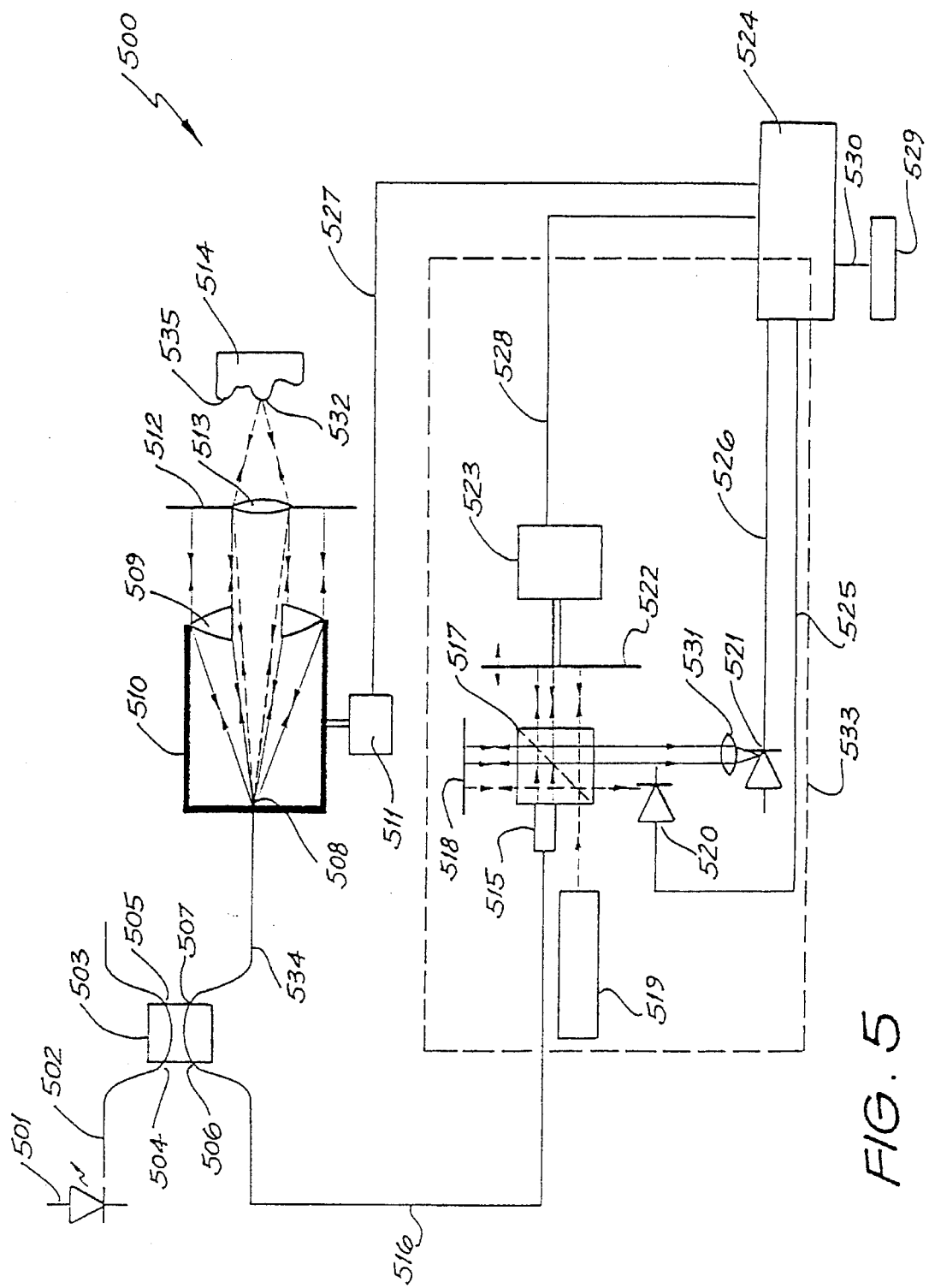
FIG. 5 is a schematic drawing of a microscope for measuring the difference between two energy paths according to the present invention.

Referring to FIG. 5 a microscope for measuring the difference between two energy path lengths 500 has partially coherent light from super luminescent diode 501 coupled into single mode fibre pigtail 502. Fibre 502 is connected to single mode fibre coupler 503 via port 504. Coupler 503 has other ports 505, 506 and 507. Port 507 is connected to single mode fibre 534 which has exit end 508 from which light from diode 501 emerges. Exit 508 is fixed to annular lens 509 by mounting assembly 510. Mounting assembly 510 call be moved in any direction by scanner 511. Annular mirror 512 and lens 513 are fixed with respect to surface 535 of object 514. Port 505 is antireflection terminated. Port 506 is connected to graded index rod lens 515 by single mode fibre 516. Lens 515 is fixed with respect to hybrid beam splitter 517, mirror 518, Helium Neon laser 519, pin diode 520, lens 531 and avalanche photo diode 521. Mirror 522 can be scantled towards and away from splitter 517 by scanner 523. Diodes 520 and 521 and scanners 511 and 523 are connected to computer 524 via lines 525,526, 527 and 528 respectively. Computer 524 is connected to photographic recorder 529 via line 530.

In operation, a 'white light' interferogram of starface 535 of object 514 is built up as follows. A portion of the short coherence length light from diode 501 is coherently guided to exit 508 via fibre 502, port 504, copier 503, port 507 and fibre 534 and focussed into a diffraction limited spot 532 approximately intersecting surface 535 by high quality lens 513. A portion of the signal light resulting front the interaction between spot 532 and surface 535, in please with the illumination light striking the surface of object 514, is collected by lens 513, injected back into exit 508 and is coherently guided to lens 515 via fibre 534, port 507, coupler 503, port 506 and fibre 516. Lens 515 collimates the signal light and directs it to the white light interferometer analyser 533 which includes beamsplitter 517, stationary mirror 518 and scanning mirror 517. A second portion of the light beam from diode 501, the reference beam, is coherently guided to end 508 via fibre 502, port 504, coupler 503, port 507 and fibre 534 and collimated by annular lens 509 to be reflected and focussed back into end 508 by mirror 512 and lens 509. (Note that for this configuration, unless the path length difference between the signal and reference beams is within the coherence length of the diode 501, typically tens of microns, the signal and reference beams do not produce a visible interference pattern until their path lengths are relatively closely matched in white light interferometer analyser 533.) Reference light entering exit 508 is coherently guided to lens 515 via fibre 534, port 507, coupler 503, port 506 and fibre 516. Lens 515 collimates the reference light and directs it through analyser 533 where it may interfere with the signal light to produce a temporal interference pattern of reduced visibility, depending on the position of mirror 522. The result of the interference between the signal and reference beams is focussed onto diode 521 by lens 531. The signal from diode 521 is monitored by computer 524. Long coherence length light from Helium Neon laser 519 passes to splitter 517 which splits it into two beams, one of which is reflected from mirror 518 to strike diode 520 and the other of which is reflected from mirror 522 and also directed to diode 520 by splitter 517. The resulting interference signal from diode 520 is monitored by computer 524.

To ensure that spot 532 substantially intersects the surface of object 514 comparator 524 moves assembly 510, and thus exit 508 and annular lens 509, axially so that spot 532 moves backwards and forwards through surface 535 of object 514 until a maximum signal is obtained on diode 521. To obtain the most accurate intersection between spot 532 and surface 535, mirror 522 is typically moved to one end of its travel thereby keeping the white light interference fringes in analyser 533 at low visibility. Mirror 522 in analyser 533 is then moved by scanner 523 under the direction of computer 524 while computer 524 keeps track of the position of mirror 522 (by analysing the signal from diode 520) and the signal from diode 521 from which the vertical distance between the surface of mirror 512 and surface 535 of object 514 at that lateral position is determined by computer 524. The vertical distance between the surface of mirror 512 and surface 535 is intensity encoded by recorder 529 as directed by computer 524. Scanner 511 then moves frame 510. and lens 509 and exit 508, laterally with respect to the surface of object 514, thereby moving spot 532 parallel to the surface of object 514, and the height of the new surface position is determined as described above. This process is repeated until a white light interferogram of the surface of object 514 has been built up.

Figure 6:
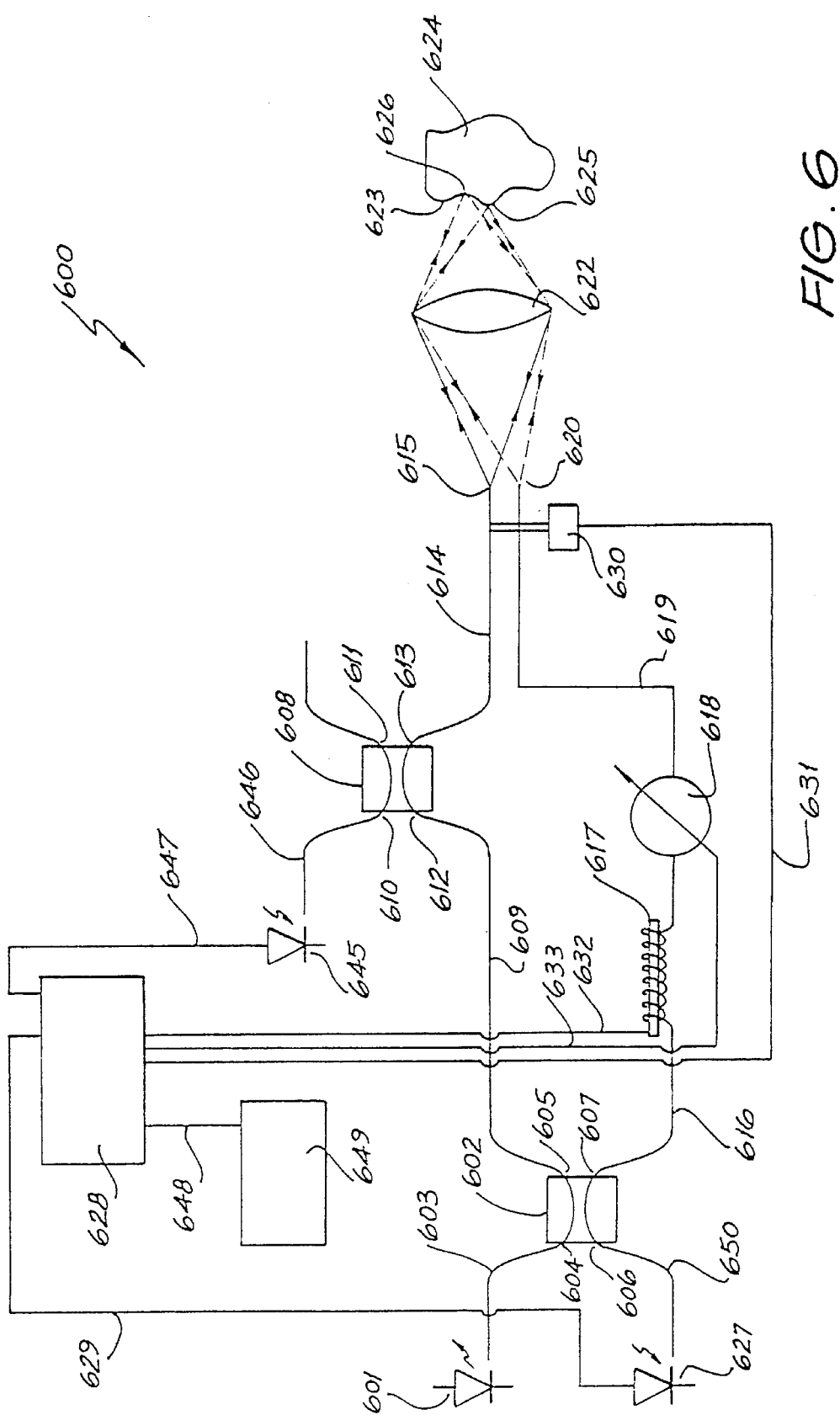
FIG. 6 is a schematic drawing of a differential interference microscope according to the present invention.

Referring to FIG. 6 a microscope for measuring the difference between two energy path lengths 600 has coherent laser diode 601 connected to single mode optical fibre coupler 602 via single mode fibre 603. Coupler 602 has ports 604, 605, 606 and 607. Port 605 is connected to single mode fibre coupler 608 via single mode fibre 609. Coupler 608 has ports 610, 611, 612 and 613. Port 613 of coupler 608 is connected to single mode fibre 614 having exit 615. Port 607 of coupler 602 is connected to single mode fibre 616. Single mode fibre 616 is wrapped partly around piezoelectric cylinder 617 and attached to attenuator 618. Single mode fibre 619 is connected to attenuator 618 and has exit 620. Illuminating light beams emerging from exits 620 and 615 are coherent with respect to one another. Lens 622 is operatively associated with exits 615 and 620 to focus coherently at least a portion of the light emerging from exits 615 and 620 into first and second spots 625 and 626 approximately intersecting the surface 623 of object 624. Lens 622 is operatively disposed to collect at least a portion of the scattered signal light beam resulting from interaction between spots 625 and 626 and surface 623 wherein the signal beam is coherent with respect to the illuminating beam. By virtue of reciprocity a portion of the first and second signal beams from spots 625 and 626 respectively are collected by lens 622 and injected into exits 615 and 620 respectively and travel to coupler 602 via coupler 608 and fibres 619 and 616 respectively whereby the first and second signal beams interfere thereby producing an interference signal which is fed to detector 627 via single mode optical fibre 650 which produces an output signal which is fed to computer 628 by line 629. Scanner 630 is connected to both fibres 614 anti 619 and can scan in the X, Y and Z directions as directed by computer 628 via line 631. Piezoelectric cylinder 617 is controlled by computer 628 via line 632 and attenuator 618 is controlled by computer 628 via line 633. Detector 645 is linked to port 610 of coupler 608 by fibre 646. The signal from detector 645 is sent to computer 628 via line 647. Recorder 649 is connected to computer 628 via line 648.

In operation an interferogram of surface 623 of object 624 is built up as follows. A first portion of the light beam from coherent laser diode 601 is coherently guided to exit 615 via single mode fibre 603, coupler 602, single mode fibre 609, coupler 608 and single mode fibre 614 and focussed into a first diffraction limited spot 625 intersecting surface 623 of object 624 by high optical quality lens 622. A second portion of the light beam from coherent laser diode 601 is coherently guided to exit 620 via single mode fibre 603, coupler 602, single mode fibre 616, attenuator 618 and single mode fibre 619 and focussed into a second diffraction limited spot 626 intersecting surface 623 of object 624 by high optical quality lens 622. A portion or the scattered and reflected signal light resulting from the interaction between spot 625 and surface 623, coherent with respect to the illuminating beam, is collected by lens 622 anti injected back into exit 615 and is coherently guided back to coupler 602 via fibres 614 and 609 and coupler 608. The numerical aperture, NA, of the signal injected into exit 615, the wavelength of the first signal beam, $\lambda$, and the diameter. d, of the core of single mode fibre 614 are related by the confocal detector pinhole relation:

$$NA < or \approx 0.13 \times \lambda/d$$

A portion of the scattered signal light resulting from the interaction between spot 626 and surface 623, coherent with respect to the illuminating beam, is collected by lens 622 and injected back into exit 620 and is coherently guided back to coupler 602 via fibres 619 and 616 and attenuator 618 where it interferes with the first signal beam. The numerical aperture, NA, of the signal injected into exit 620, the wavelength of the second signal beam, $\lambda$, and the diameter, d, of the core of single mode fibre 619 are related by the confocal detector pinhole relation:

$$NA < or \approx 0.13 \times \lambda/d$$

The result of the interference emerges from port 606 of coupler 602 to be detected by detector 627 via fibre 650 the signal of which is fed to computer 628 by line 629. A portion of the signal light injected into fibre exit 615 emerges from port 610 of coupler 608 to be guided by fibre 646 to detector 645 which detects the intensity level. This intensity level is ted to computer 628 by line 647. Computer 628 moves exits 615 and 620 axially with respect to surface 623 via scanner 630 and line 631. Now to ensure spot 625 substantially intersects surface 623 computer 628 moves exit 615 (and exit 620) until detector 645 detects a maximum signal. Then computer 628 adjusts attenuator 618 to match the two signal beam intensities. Computer 628 then stretches fibre 616 with piezoelectric cylinder 617 driven by line 632 to maintain the interference signal in quadrature to ensure high sensitivity. The error signal used to maintain the interferometer in quadrature is used to determine to a high resolution the height difference of the surface 623 between spots 625 and 626 at that general lateral position. This height difference is stored by recorder 649. Scanner 630 then moves exits 615 and 620 laterally with respect to surface 623 thereby moving spots 625 and 626 laterally with respect to surface 623 and the differential height of the new surface position is determined as described above. This process is repeated until a differential interferogram of the scanned surface 623 of object 624 has been built up and stored.

INDUSTRIAL APPLICABILITY

The methods and microscopes of the invention facilitate the measurement of the position of an object or measurement of the surface profile of an object to a high resolution. The methods and microscope of the invention are not limited to uses which involve displaying images of objects. The microscope of the invention may for part of another apparatus, such as a thickness measuring apparatus which incorporates an alarm. An interference microscope according to the invention may also be used in environments where vibration is a problem as it can be aligned more readily and there are fewer parts to maintain in alignment as compared to conventional interference microscopes. In addition, the energy source and detectors can be placed distant from the location at which the measurement is to be made, enabling them to be placed in mechanical and electrically quiet locations without the need for complicated electrical and mechanical isolation. Further, since there are fewer parts than would be required in a standard interference microscope, it is cheaper to manufacture and maintain. In a particular embodiment of an interference microscope of the invention, because of the use of tire novel arrangement of the same fibre end being used for the pinhole source and the pinhole detector, it is not susceptible to misalignment of the source detector optical system and therefore continuous monitoring of the microscope alignment is not necessary. Moreover, because of the design an inteference microscope according to the invention can be used to rapidly scan an object in all three dimensions thus producing rapidly, extremely high resolution images or measurements on objects.

When compared to other, more conventional, interference microscopes and particularly confocal interference microscopes, apparatus according to the invention is inherently more stable as the energy paths are typically inside energy guides where disturbances due to such things as air currents do not pose a problem.

While having tire advantages outlined above apparatus according to the invention can be used for high resolution distance measurement, to small objects in particular, very high resolution surface profile and surface roughness determinations with high lateral resolution such as for the inspection of microchips, the accurate measurement of the thickness or refractive index profile of partially transparent objects including monolayer or multilayer sheets for packaging or other purposes, glass or plastic container shapes and wall thicknesses or biological cellular dimensions, the retrieval (and storage) of information stored in a high storage density three dimensional storage medium or non-linear spectroscopic applications including fluorescence and Raman spectroscopy in which the object to be studied is small and/or may need to be be precisely located in space, for example.

I claim:

1. A method for determining the refractive index of an object between two locations in said object, wherein said object is a partially energy transparent object with a known path length between, first and second locations in said object, by measuring the difference between two energy path lengths, said method comprising:

spatially filtering confocally and coherently directing a portion of an illuminating energy beam from a coherent energy source through a first coherent energy guide to an energy exit port denoted the first exit;

coherently directing a second portion of said illuminating energy beam through a second coherent energy guide to an energy exit port denoted the second exit;

wherein said first and second portions of said illuminating energy beam are at least partly coherent and respect to one another on emerging from said first and second exits respectively;

focussing coherently at least a portion of illuminating energy emerging from said first exit into a first spot intersecting said object;

coherently directing at least a portion of a first coherent signal energy beam resulting from interaction between said illuminating energy beam in said first spot and said object to an interferometer, said first signal beam being coherent with respect to said illuminating energy beam;

focussing coherently at least a portion of illuminating energy emerging from said second exit into a second spot intersecting said object;

coherently directing at least a portion of a second coherent signal energy beam resulting from interaction between said illuminating energy beam in said second spot and said object to said interferometer; said second signal beam being coherent with respect to said illuminating energy beam;

wherein said first spot is at a first location in said object, said second spot is formed by focussing through said object via said first location to a second location in said object;

whereby said first and second signal beams interfere thereby producing an output signal;

calculating from said output signal said energy path length difference between said first energy path from said energy source, through said first energy guide to the intersection of said first spot with said object to said interferometer and said second energy path from said energy source, through said second energy guide to the intersection of said second spot with said object to said interferometer; and determining the refractive index of said object between said first and second locations in said object by comparing said energy path length difference with said known path length.

2. A method for determining the path length between two locations in an object, wherein said object is a partially energy transparent object with known refractive index between first and second locations in said object by measuring the difference between two energy path lengths, said method comprising:

coherently directing a portion of an illuminating energy beam from a coherent energy source through a first coherent energy guide to an energy exit port denoted the first exit;

coherently directing a second portion of said illuminating energy beam through a second coherent energy guide to an energy exit port denoted the second exit:

wherein said first and second portions of said illuminating energy beam are at least partly coherent with respect to one another on emerging from said first and second exits respectively;

focussing coherently at least a portion of illuminating energy emerging from said first exit into a first spot intersecting an object;

spatially filtering confocally and coherently directing at least a portion of a first coherent signal energy beam resulting from interaction between said illuminating energy beam in said first spot and said object to an interferometer, said first signal beam being coherent with respect to said illuminating energy beam;

focussing coherently at least a portion of illuminating energy emerging from said second exit into a second spot intersecting said object;

coherently directing at least a portion of a second coherent signal energy beam resulting from interaction between said illuminating energy beam in said second spot and said object to said interferometer, said second signal beam being coherent with respect to said illuminating energy beam;

wherein said first spot is at a first location in said object, said second spot is formed by focussing through said object via said first location to a second location in said object;

whereby said first and second signal beams interfere thereby producing an output signal; and calculating from said output signal said energy path length difference between said first energy path from said energy source, through said first energy guide to the intersection of said first spot with said object to said interferometer and said second energy path from said energy source, through said second energy guide to the intersection of said second soot with said object to said interferometer; and determining the path length between said first and second locations from said energy path length difference with said known refractive index.

3. A method for determining refractive index of an object with known path length between first and second locations in said object, comprising:

(a) coherently directing a portion of an illuminating energy beam from a coherent energy source through a first coherent energy guide an energy exit port denoted the first exit;

(b) coherently directing a second portion of said illuminating energy beam through a second coherent energy guide to an energy exit port denoted the second exit;

wherein said first and second portions of said illuminating energy beam are at least partly coherent with respect to one another on emerging from said first and second exits respectively;

(c) focussing coherently at least a portion of illuminating energy emerging from said first exit into a first spot intersecting said object at a first location;

(d) coherently directing at least a portion of a first coherent signal energy beam resulting from interaction between said illuminating energy beam in said first spot and said object at said first location to an interferometer, said first signal beam being coherent with respect to said illuminating energy beam;

(e) directing coherently at least a portion of said first portion of said illuminating energy beam, denoted the first reference beam, from said first exit to said interferometer whereby said first reference beam and said first signal beam interfere thereby producing a first output signal;

(f) calculating from a first output signal said first energy path length difference between a first energy path from said energy source, through said first energy guide to the intersection of said first spot with said object at said first location and from said first location to said interferometer and a second energy path from said energy source, through said second energy guide to said interferometer;

(g) repeating steps (a) and (b);

(h) focussing coherently at least a portion of illuminating energy emerging from said first exit through said object via said first location into a second spot intersecting said object at a second location;

(i) coherently directing at least a portion of a second coherent signal energy beam resulting from interaction between said illuminating energy beam in said second spot and said object at said second location to the interferometer, said second signal beam being coherent with respect to said illuminating energy beam;

(j) directing coherently at least a portion of said second portion of said illuminating energy beam, denoted the second reference beam, from said second exit to said interferometer whereby the second reference beam and said second signal beam interfere thereby producing a second output signal; and (k) calculating from said second output signal said second energy path length difference between a third energy path from said energy source, through said first energy guide to the intersection of said second spot with said object at said second location and from said second location to said interferometer and a fourth energy path from said energy source, through said second energy guide to said interferometer;

(l) determining the refractive index of said object between said first and second locations in said object by comparing said first and second energy path length differences with said known path length.

4. A method for determining path length between two locations in an object, wherein the object is a partially energy transparent object with known refractive index between first and second locations in the object, comprising;

(a) coherently directing a portion of an illuminating energy beam from a coherent energy source through a first coherent energy guide to an energy exit port denoted the first exit;

(b) coherently directing a second portion of the illuminating energy beam through a second coherent energy guide to an energy exit port denoted the second exit;

wherein the first and second portions of the illuminating energy beam are at least partly coherent with respect to one another on emerging from the first and second exits respectively;

(c) focussing coherently at least a portion of illuminating energy emerging from the first exit into a first spot intersecting the object at a first location;

(d) coherently directing at least a portion of a first coherent signal energy beam resulting from interaction between the illuminating energy beam in the first spot and the object at the first location to an interferometer, the first signal beam being coherent will respect to the illuminating energy beam;

(e) directing coherently at least a portion of the first portion of the illuminating energy beam, denoted the first reference beam, from the first exit to the interferometer whereby the first reference beam and the first signal beam interfere thereby producing a first output signal; and (f) calculating from the first output signal a first energy path length difference between a first energy path from the energy source, through the first energy guide to the intersection of the first spot with the object at the first location and from the first location to the interferometer and a second energy path from the energy source, through the second energy guide to the interferometer;

(g) repeating steps (a) and (b);

(h) focussing coherently at least a portion of illuminating energy emerging from the first exit through the object via the first location into a second spot intersecting the object at a second location;

(i) coherently directing at least a portion of a second coherent signal energy beam resulting from interaction between the illuminating energy beam in the second spot and the object at the second location to said interferometer, the second signal beam being coherent with respect to the illuminating energy beam;

(j) directing coherently at least a portion of the second portion of the illuminating energy beam, denoted the second reference beam, from the second exit to the interferometer whereby the second reference beam and the second signal beam interfere thereby producing a second output signal; and (k) calculating from the second output signal the second energy path length difference between a third energy path from the energy source, through the first energy guide to the intersection of the second spot with the object at the second location and from the second location to the interferometer and a fourth energy path from the energy source, through the second energy guide to the interferometer;

(l) determining the path length between the first and second locations in the object by comparing the first and second energy path length differences with the known refractive index.

5. The method of any one of claims 1–4 further comprising:

scanning the object by moving the spot(s) relative to the object.

6. The method of any one of claims 3 or 4 wherein the signal energy beam(s) is spatially filtered confocally before the interferometer.

7. A microscope for measuring the difference between two energy path lengths comprising:

an energy source which emanates an illuminating energy beam wherein at least a portion of the illuminating energy beam is substantially coherent;

a first coherent energy guide operatively associated with the energy source to receive coherently a first portion of the coherent illuminating energy beam, the first coherent energy guide having an energy exit port denoted the first exit;

a second coherent energy guide operatively associated with the energy source to receive coherently a second portion of the coherent illuminating energy beam, the second coherent energy guide having an energy exit port denoted the second exit;

wherein the illuminating energy beams are coherent with respect to one another on emerging from the first and second exit;

an energy focusser operatively associated with the first exit for focussing coherently at least a portion of illuminating energy emerging from the first exit into a spot intersecting an object;

a first energy director operatively associated with the first exit and the focusser for spatially filtering confocally and coherently directing at least a portion of a signal energy beam resulting from interaction between the illuminating energy beam in the spot and the object to an interferometer, the signal beam being coherent with respect to the illuminating energy beam;

a second energy director operatively associated with the second exit and the interferometer to direct coherently at least a portion of the second portion of the illuminating energy beam, denoted the reference beam, from the second exit to the interferometer whereby the reference beam and the signal beam interfere thereby producing an output signal; and a calculator operatively associated with the interferometer to calculate from the output signal the energy path length difference between a first energy path from the energy source, through the first energy guide to the intersection of the spot with the object via the focusser and from the intersection to the interferometer via the first energy director and a second energy path from the energy source, through the second energy guide to the interferometer via the second energy director.

8. A microscope for measuring the difference between two energy path lengths comprising:

an energy source which emanates an illuminating energy beam wherein at least a portion of the illuminating energy beam is substantially coherent;

a first coherent energy guide operatively associated with the energy source to receive coherently a first portion of the coherent illuminating energy beam, the first coherent energy guide having an energy exit port denoted the first exit;

a second coherent energy guide operatively associated with the energy source to receive coherently a second portion of the coherent illuminating energy beam, the second coherent energy guide having an energy exit port denoted the second exit;

wherein the illuminating energy beams are coherent with respect to one another on emerging from the first and second exits;

a first energy focusser operatively associated with the first exit for focussing coherently at least a portion of illuminating energy emerging from the first exit into a first spot intersecting an object;

a first energy director operatively associated with the first exit and the first focusser for spatially filtering confocally and coherently directing at least a portion of a first signal energy beam resulting from interaction between the illuminating energy beam in the first spot and the object to an interferometer, the first signal beam being coherent with respect to the illuminating energy beam;

a second energy focusser operatively associated with the second exit for focussing coherently at least a portion of illuminating energy emerging from the second exit into a second spot intersecting said object;

a second energy director operatively associated with the second exit and the second focusser for coherently directing at least a portion of a second signal energy beam resulting from interaction between the illuminating energy beam in the second spot and the object to the interferometer, the second signal beam being coherent with respect to the illuminating energy beam;

whereby the first and second signal beams interfere thereby producing an output signal; and a calculator operatively associated with the interferometer to calculate from the output signal the energy path length difference between a first energy path from the energy source, through the first energy guide to the intersection of the first spot with the object via the first focusser and from the intersection of the first spot with the object to the interferometer via the first energy director and a second energy path from the energy source, through the second energy guide to the intersection of the second spot with the object via the second focusser and from the intersection of the second spot with the object to the interferometer via the second energy director.

9. The microscope of claim 8 wherein the first and second focussers are the same focusser.

10. The microscope of claim 7 or 8 wherein the first and second coherent energy guides are the same coherent energy guide and the first and second directors are the same director.

11. The microscope of claim 8 wherein the second director comprises at least one energy guide and at least one energy focusser for collecting the second signal beam the energy focusser(s) being operatively associated with the second energy guide to image the core of the second energy guide at its entrance onto the second spot whereby the numerical apertfore NA, of the second signal beam originating from the central portion of the second spot, the wavelength of the second signal beam, $\lambda$, and the average diameter, d, of the energy guiding core of the second energy guide at its entrance are related by the equation:

$$NA < or \approx 0.6 \times \lambda/d.$$

12. The microscope of claim 7, 8 or 11 wherein the first director comprises at least one energy guide and at least one energy focusser for collecting the first signal beam said energy focusser(s) being operatively associated with said first energy guide to image the core of the first energy guide at its entrance onto the first spot whereby the numerical aperture NA of the first signal beam origination from the central portion of the first spot, the wavelength of the first signal beam, $\lambda$, and the average diameter, d, of the energy guiding core of the first energy guide at its entrance are related by the equation:

$$NA < or \approx 0.6 \times \lambda/d.$$

13. The microscope of claim 7, 8 or 11 wherein the first and second energy directors comprise portions of the first and second energy guides.

14. The microscope of claim 7, 8 or 11 wherein the first and second exits are coupled so as to be fixed relative to one another and further comprising a scanner operatively associated with the exits to move the spot(s) relative to the object.

15. The microscope of claim 7, 8 or 11 wherein the first or second energy path includes an energy path length changer and the calculator is operatively associated with the energy path length changer to enable quadrature operation of the interferometer.

16. The microscope of claim 7, 8 or 11 wherein the microscope further comprises:

a third coherent energy guide operatively associated with the energy source;

a first energy splitter operatively associated with the third coherent energy guide and the first and second energy guides whereby coherent illuminating energy emanating from the energy source is coupled coherently into the third energy guide to guide coherently a portion of the illuminating energy to the first energy splitter wherein a portion of the energy is coupled coherently into the first energy guide and another portion of the illuminating energy is coupled coherently into the second energy guide.

17. The microscope of claim 7, 8 or 11 further comprising a scanner operatively associated with the microscope to move the spot(s) relative to the object.

18. The microscope of claim 7, 8 or 11 wherein the energy source is a source of electromagnetic radiation with a wavelength in the range of and including far UV to far IR, the energy guide(s) is a multimode optical fibre(s), single mode optical fibre(s) or coherent fibre brindle(s).

19. A microscope for measuring the difference between two light path lengths comprising:

a light source which emanates an illumination light beam having at least one wavelength in the range of far UV to far IR wherein at least a portion of the illuminating light beam is substantially coherent;

a first optical fibre operatively associated with a first light splitter to receive coherently a first portion of the coherent illuminating light beam, the first optical fibre having a second light splitter and a light exit port denoted the first exit;

a second optical fibre operatively associated with the light source to receive coherently a second portion of the coherent illuminating light beam via the first light splitter, the second optical fibre having a light exit port denoted the second exit and having a light path length changer;

wherein the illuminating light beams are coherent with respect to one another on emerging from the first and second exits;

a light focusser operatively associated with the first exit for focussing coherently at least a portion of illuminating light emerging from the first exit into a diffraction limited spot intersecting an object;

wherein the focusser is operatively associated with the first exit for coherently directing at least a portion of a signal light beam resulting from interaction between the spot and the object to the first exit and thereby to the first light splitter which acts as an interferometer, via the first optical fibre and the second light splitter, the signal beam being coherent with respect to the illuminating light beam;

wherein the numerical aperture NA, of the signal beam originating from the central portion of the spot, the wavelength of the signal light beam, $\lambda$, and average diameter, d, of the light guiding core of the first optical fibre at the first exit are related by the equation:

$$NA < or \approx 0.6 \times \lambda/d$$

a light reflector operatively associated with the second exit and the interferometer to direct coherently at least a portion of the second portion of the illuminating light beam, denoted the reference beam, to the first light splitter via the second exit and the second optical fibre whereby the reference beam and the signal beam interfere thereby producing an output signal;

a first detector operatively associated with the first splitter to detect the output signal;

a scanner operatively associated with the first and second exits whereby the first and second exits are movable relative to the focusser and the reflector, which focusser and reflector are stationary with respect to the object, but which exits are not movable with respect to each other;

a second detector operatively associated with the second splitter to detect signal light from the first optical fibre; and a calculator operatively associated with the light path length changer, the first detector and the first light splitter to maintain the interference between the reference and signal beams in quadrature, to calculate the light path length difference between a first light path from the light source, through the first optical fibre to the intersection of the spot with the object via the first exit and the focusser and from the intersection back to the first light-splitter via the focusser, the first exit and the first optical fibre and a second light path from the light source, through the second optical fibre back to the first light splitter via the second exit, the light reflector and the second exit and back through the second optical fibre, and determine via the second detector when the spot is substantially focussed on the surface of the object.

20. A microscope for measuring the difference between two light path lengths comprising:

a light source which emanates an illuminating light beam having at least one wavelength in the range of far UV to hr IR wherein at least a portion of the illuminating light beam is substantially coherent;

a first optical fibre operatively associated with a first light splitter to receive coherently a first portion of the coherent illuminating light beam, the first optical fibre having a second light splitter and a light exit port denoted the first exit;

a second optical fibre operatively associated with the light source to receive coherently a second portion of the coherent illuminating light beam via the first light splitter, the second optical fibre having a light exit port denoted the second exit and having a light path length changer;

wherein the illuminating light beams are coherent with respect to one another on emerging from the first and second exits;

a light focusser operatively associated with the first exit for focussing coherently at least a portion of illuminating light emerging from the first exit into a first diffraction limited spot intersecting an object;

wherein the focusser is operatively associated with the first exit for coherently directing at least a portion of a first signal light beam resulting from interaction between the first spot and the object to the first exit and thereby to the first light splitter which acts as an interferometer, via the first optical fibre and the second light splitter, the first signal beam being coherent with respect to the illuminating light beam;

wherein the numerical aperture NA, of the first signal beam originating from the central portion of the first spot, the wavelength of the first signal light beam, $\lambda$, and average diameter, d, of the light guiding core of the first optical fibre at the first exit are related by the equation:

$$NA < or \approx 0.6 \times \lambda/d$$

said light focusser being operatively associated with the second exit for focussing coherently at least a portion of illuminating light emerging from the second exit into a second diffraction limited spot intersecting the object;

wherein the focusser is operatively associated with the second exit for coherently directing at least a portion of a second signal light beam resulting from interaction between the second spot and the object to the second exit anti thereby to the first light splitter which acts as an interferometer, via the second optical fibre, the second signal beam being coherent with respect to the illuminating light beam:

wherein the numerical aperture NA, of the second signal beam originating from the central portion of the second spot, the wavelength of the second signal light beam, $\lambda$, and average diameter, d of the light guiding core of the second optical fibre at the second exit are related by the equation:

$$NA < or \approx 0.6 \times \lambda/d$$

whereby the first and second signal beams interfere thereby producing an output signal;

a first detector operatively associated with the first splitter to detect the output signal:

a scanner operatively associated with the first and second exits whereby the first and second exits are movable relative to the focusser, which is stationary with respect to the object, but are not movable with respect to each other;

a second detector operatively associated with the second splitter to detect signal light from the first optical fibre; and a calculator operatively associated with the light path length changer, the first detector and the first light splitter to maintain the interference between the first and second signal beams in quadrature, to calculate light path length difference between a first light path from the light source, through the first optical fibre to the intersection of the first spot with the object via the first exit and the focusser and from the intersection back to the first light splitter via the focusser, the first exit and the first optical fibre a the second light path from the light source, through the second optical fibre back to the first light splitter via the second exit, the focusser and from the intersection back to the first light splitter via the focusser, the second exit and the second optical fibre, and determine via the second detector when the first spot is substantially focussed on the surface of the object.

* * * * *